United States Patent
Dufrene et al.

(10) Patent No.: US 10,097,220 B2
(45) Date of Patent: Oct. 9, 2018

(54) INTERFERENCE DETECTION DEVICE, INTERFERENCE DETECTION APPARATUS, INTERFERENCE DETECTION METHOD, COMPUTER PROGRAM, RECEIVER, MOBILE TERMINAL AND BASE STATION

(71) Applicant: Intel IP Corporation, Santa Clara, CA (US)

(72) Inventors: Krzysztof Dufrene, Plesching (AT); Silvester Sadjina, Linz (AT); Andreas Gebhard, Linz (AT); Ram S. Kanumalli, Linz (AT)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/590,073

(22) Filed: May 9, 2017

(65) Prior Publication Data

US 2017/0359092 A1  Dec. 14, 2017

(30) Foreign Application Priority Data

Jun. 10, 2016  (EP) .................................... 16173857

(51) Int. Cl.
*H04B 1/10* (2006.01)
*H04B 1/04* (2006.01)
(Continued)

(52) U.S. Cl.
CPC ......... *H04B 1/0475* (2013.01); *H04B 1/1027* (2013.01); *H04B 1/123* (2013.01); *H04B 10/697* (2013.01); *H04B 1/10* (2013.01)

(58) Field of Classification Search
CPC .... H04B 1/0475; H04B 1/1027; H04B 1/123; H04B 10/697; H04B 1/10
See application file for complete search history.

(56) References Cited

U.S. PATENT DOCUMENTS

| | | | | |
|---|---|---|---|---|
| 5,046,133 A | * | 9/1991 | Watanabe ............... | H04B 1/126 455/138 |
| 8,977,211 B1 | * | 3/2015 | Tinella ................... | H04B 17/00 455/231 |

(Continued)

OTHER PUBLICATIONS

PeterLaaser,"Mitigation of TX Modulated Spursin RX Path of SMARTi5,"Internal Project Presentation, Intel, Munich, 2015.

(Continued)

*Primary Examiner* — Nguyen Vo
(74) *Attorney, Agent, or Firm* — 2SPL Patentanwälte PartG mbB; Mani Arabi

(57) ABSTRACT

Examples provide a device, an apparatus, a method, a computer program, a receiver, a mobile terminal and a base station. An interference detection device (10) is configured to generate an auxiliary interference signal for a multi-carrier receive signal. The device (10) comprises a generator (12) configured to generate a plurality of oscillator signals. The plurality of oscillator signals comprises at least a first oscillator signal with a first local oscillator frequency. The plurality of oscillator signals further comprises a second oscillator signal with a second local oscillator frequency. The device (10) further comprises a plurality of subsequent mixers. A first mixer (14) is configured to mix the multi-carrier receive signal with the first oscillator signal to output a first mixed signal. A second mixer (16) is configured to mix a second mixed signal with the second oscillator signal to output the auxiliary interference signal.

23 Claims, 17 Drawing Sheets

(51) Int. Cl.
　　　*H04B 1/12*　　　　(2006.01)
　　　*H04B 10/69*　　　(2013.01)

(56) References Cited

U.S. PATENT DOCUMENTS

| | | | |
|---|---|---|---|
| 9,025,646 B2* | 5/2015 | Aparin | H04B 1/40 |
| | | | 375/219 |
| 2010/0167682 A1 | 7/2010 | Vaisanen | |
| 2016/0164557 A1* | 6/2016 | Li | H04B 1/1036 |
| | | | 455/307 |
| 2017/0163308 A1* | 6/2017 | Fattinger | H04B 1/44 |

OTHER PUBLICATIONS

Ahmed Elmaghraby, "Transmitter Leakage Cancellation in Cellular Handset Receivers," PhD Dissertation, University of Erlangen-Nuremberg, 2015.

David Murphy, Darabi Hooman, and Hao Xu. "A Noise-Cancelling Receiver Resilient to Large Harmonic Blockers", IEEE Journal of Solid-State Circuits 50, 2015.

S. Ayazian, R. Gharpurey, "Feedforward Interference Cancellation in Radio Receiver Front-Ends," IEEE Trans. Circuits Syst. II, vol. 54, pp. 902-906, Oct. 2007.

T. Schlechter and M. Huemer, "Advanced filter bank based approach for blocker detection in LTE systems," Circuits and Systems (ISCAS), 2011 IEEE International Symposium on, Rio de Janeiro, 2011, pp. 2189-2192.

* cited by examiner

FIG. 5
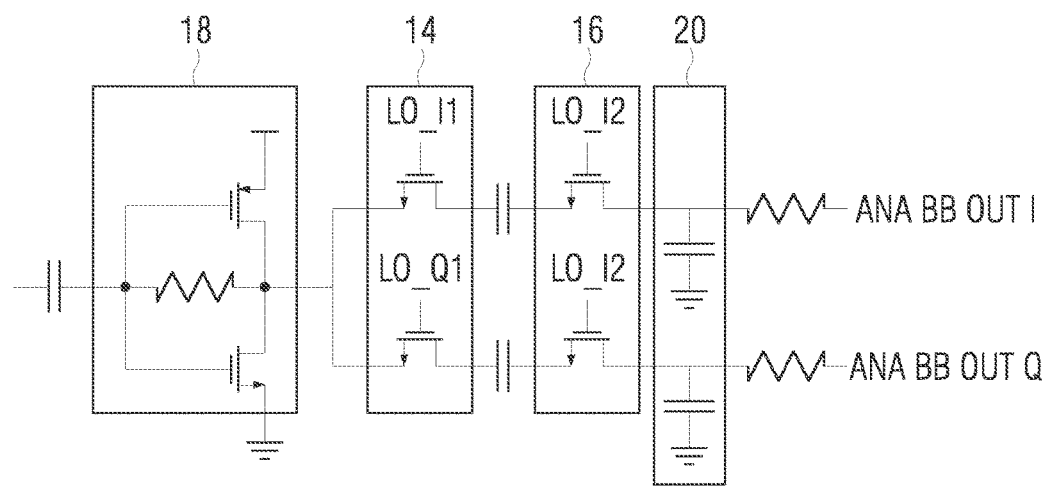
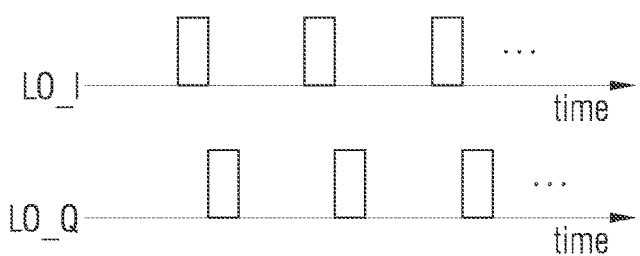

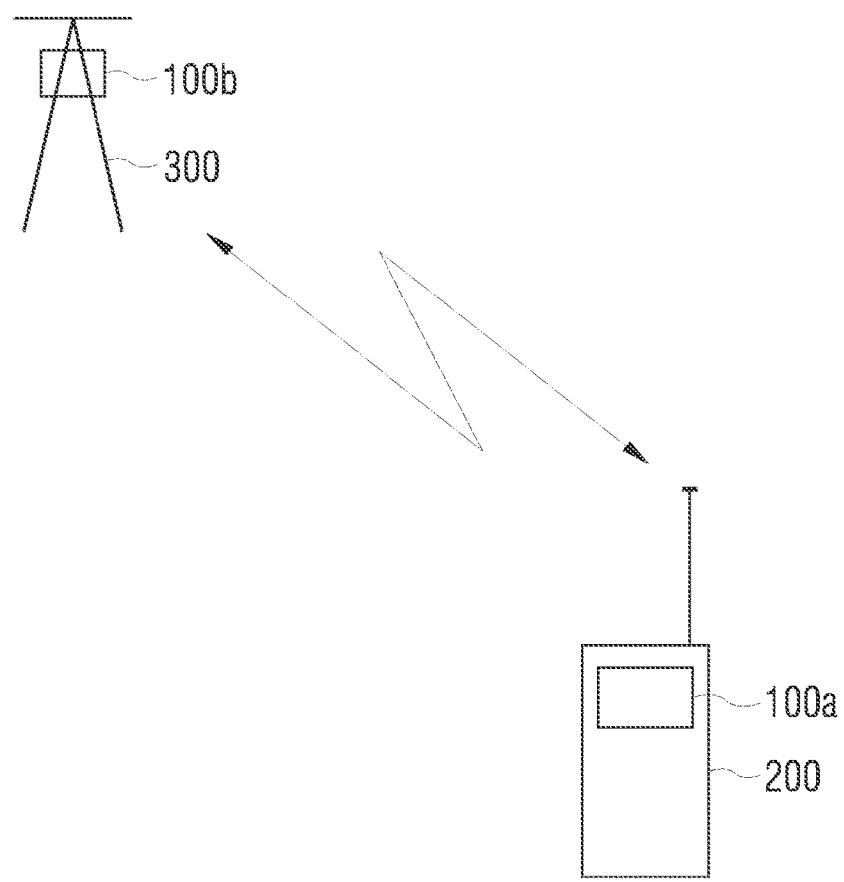

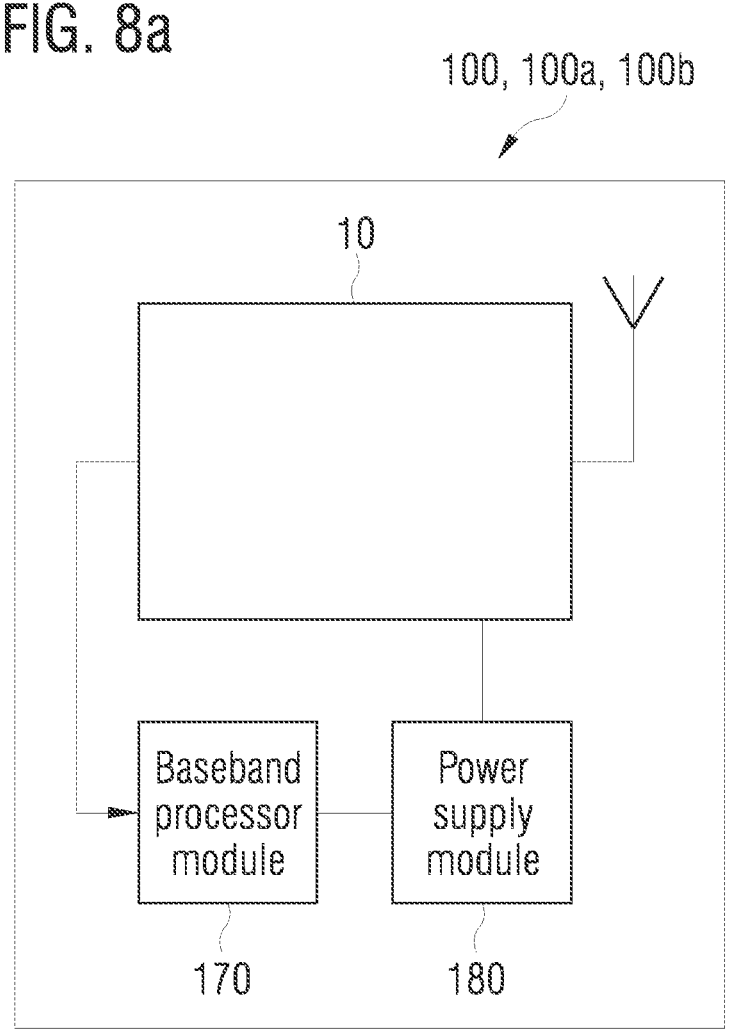

INTERFERENCE DETECTION DEVICE, INTERFERENCE DETECTION APPARATUS, INTERFERENCE DETECTION METHOD, COMPUTER PROGRAM, RECEIVER, MOBILE TERMINAL AND BASE STATION

FIELD

Examples relate to generation of auxiliary interference signals based on which interference can be reduced or canceled, in particular, but not exclusively, to a device, an apparatus, a method, a computer program, a receiver, a mobile terminal and a base station, enabling detection and reduction of inter-modulated interference in a multi-carrier receive signal.

BACKGROUND

With the growing demand on wireless services bandwidths of systems are increased, for example, using carrier aggregation. Performance of cellular Radio Frequency (RF) receivers, and in particular their Signal-to-Noise-and-Distortion Ratio (SNDR, performance metric), can be significantly degraded in case of carrier aggregation receive scenarios, in which the receiver operates using several frequency synthesizers RXLO1, RXLO2, . . . , RXLOx generating distinct local oscillator signals LO1, LO2, . . . , LOx with corresponding frequencies fLO1, fLO2, . . . , fLOx. Due to device nonlinearities and cross-talk between receive paths resulting from unavoidable layout imperfections, Continuous Wave (CW) spurious signals having tones at h1*fLO1+h2*fLO2+ . . . +hx*fLOx frequencies (h1, h2, . . . , hx are integer numbers) appear at various nodes of the receive circuit. CW spurs appearing in BaseBand blocks may directly affect received signal quality if their frequency falls into the BB/Intermediate Frequency (IF) bandwidth of the wanted signal. In contrast, CW spurs present in LO paths may cause down-conversion of unwanted and possibly modulated signals appearing at the RF input of the receiver.

BRIEF DESCRIPTION OF THE FIGURES

Some examples of apparatuses and/or methods and/or computer programs will be described in the following by way of example only, and with reference to the accompanying figures, in which

FIG. 5 illustrates an implementation of an interference detection device;

FIG. 8 shows examples of a mobile terminal and a base station comprising an example receiver;

FIG. 8a shows an example of a receiver of a mobile terminal;

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some examples thereof are shown by way of example in the figures and will herein be described in detail. It should be understood, however, that there is no intent to limit examples to the particular forms disclosed, but on the contrary, examples are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular examples only and is not intended to be limiting of further examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art, unless expressly defined otherwise herein.

Figure 1:
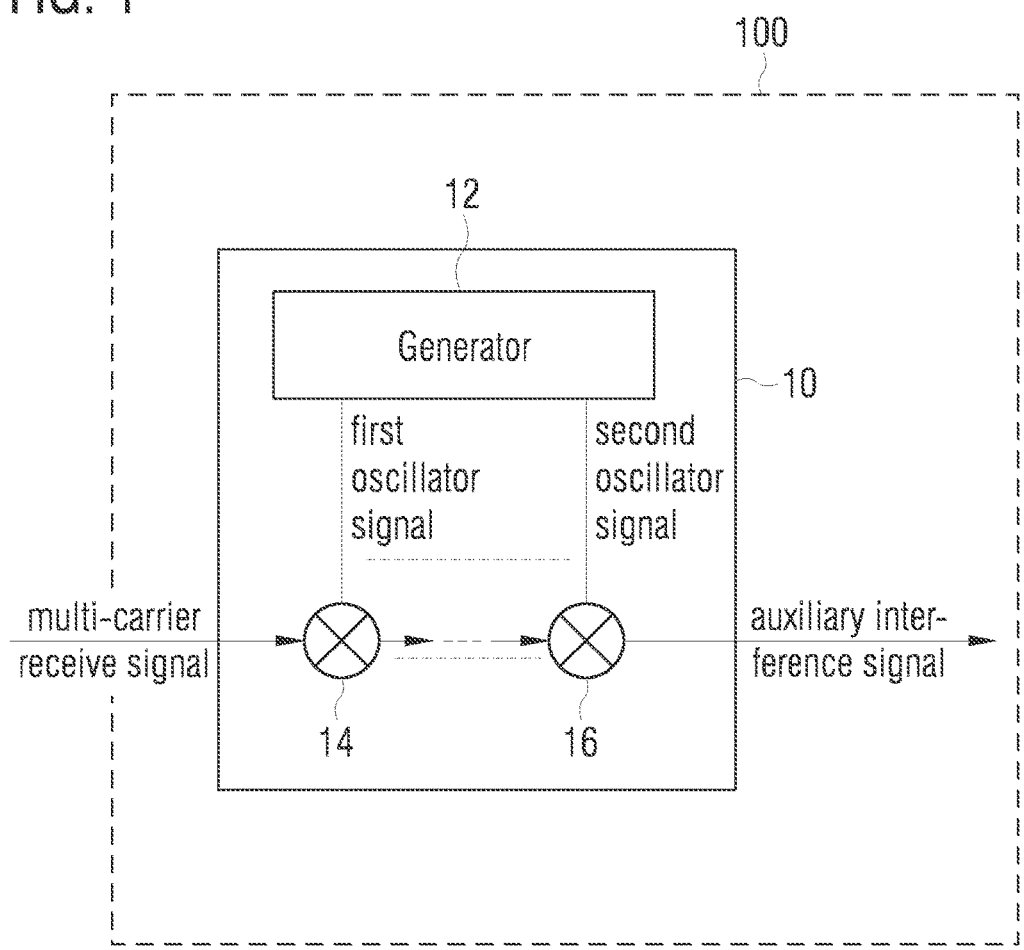
FIG. 1 illustrates an example of an interference detection device, an example of an interference detection apparatus, and an example of a receiver.

FIG. 1 shows an example of an interference detection device 10, which is configured to generate an auxiliary interference signal for a multi-carrier receive signal. Based on the auxiliary interference signal subsequent interference cancellation or reduction may be carried out in the multi-carrier receive signal. The interference detection device 10 comprises a generator 12, which is configured to generate a plurality of oscillator signals. The generator 12 may correspond to one or more generator units, one or more generator devices, one or more generator modules, one or more generator circuits, any means for generating, etc. For example, one or more oscillators or signal generators may be used, for example, voltage controlled oscillators, etc.

The plurality of oscillator signals comprises at least a first oscillator signal with a first local oscillator frequency. The first local oscillator frequency may be adjusted to a first carrier frequency of the multi-carrier receive signal. The plurality of oscillator signals comprises a second oscillator signal with a second local oscillator frequency. The second local oscillator frequency may be adjusted to a second carrier frequency of the multi-carrier receive signal. The adjustment of the second oscillator signal may correspond to an adaptation, approximation or equalization to the second carrier frequency, including, for example, an intermediate frequency relating to the second carrier frequency. The interference detection device 10 further comprises a plurality of (at least two) subsequent mixers, which are coupled to the generator 12. A mixer may correspond to one or more mixing modules, one or more mixing units, one or more mixing devices, one or more mixing circuits, any means for mixing, etc. A mixer may be implemented as a non-linear circuit that mixes signals of two different frequencies, wherein a result of mixing comprising multiple frequencies different from the input frequencies.

For example, the output comprises signal components at a sum of the input frequencies and at the difference between the input frequencies, these signals may also be referred to as heterodynes. Other signal components at different frequencies may also be obtained. An unbalanced mixer may, for example, also produce components at the same frequencies as the input signals at its output. Such signals may be obtained by realizing a summation and/or multiplication of the input signals, which can be achieved using a non-linear component, e.g. a diode or a transistor. Single balanced mixers may provide only one of the input frequencies at their output; double balanced mixer may suppress any input frequency at the output. Mixers are, for example, used to shift signals in the frequency domain. Such frequency shifts are desirable when converting signals from a transmission band to another band, e.g. an intermediate frequency or a baseband. Signals at other frequencies, which are also generated when mixing, are mostly suppressed using accordingly tuned or adapted filter mechanisms.

However, when applying mixing in such processing other signals or unwanted signals also get shifted in the frequency domain and components of these may end up as interference or unwanted signals negatively influencing wanted signals and leading to decrease transmission quality, errors, re-transmissions, service outage, etc. In examples any type of mixer may be used as heterodynes are the signals of interest. From these signals replica of interferers may be constructed, e.g. crosstalk, spurious interference, CW signals, narrow-band interferers, etc. which experience the same mixing or signal processing as in a receive processing chain for the wanted signal. Such unwanted signal parts will be commonly referred to as interference.

In the example of FIG. 1 a first mixer 14 is configured to mix the multi-carrier receive signal with the first oscillator signal to output a first mixed signal. A second mixer 16 is configured to mix a second mixed signal with the second oscillator signal to output or to obtain the auxiliary interference signal. The auxiliary interference signal may then be used in subsequent processing to indicate interference signals as will be detailed in the sequel.

FIG. 1 illustrates likewise an example of an interference detection apparatus 10 for generating an auxiliary interference signal for a multi-carrier receive signal. The interference detection apparatus 10 comprises means for generating 12 a plurality of oscillator signals. The plurality of oscillator signals comprises at least a first oscillator signal with a first local oscillator frequency. The first local oscillator frequency may be adjusted to a first carrier frequency of the multi-carrier receive signal. The plurality of oscillator signals comprises at least a second oscillator signal with a second local oscillator frequency. The second local oscillator frequency may be adjusted to a second carrier frequency of the multi-carrier receive signal. The interference detection circuit comprises a plurality of subsequent mixing means, which are coupled with the means for generating 12. A first mixing means 14 is configured to mix the multi-carrier receive signal with the first oscillator signal to output a first mixed signal. A second mixing means 16 is configured to mix a second mixed signal with the second oscillator signal to obtain or to output the auxiliary interference signal. FIG. 1 also illustrates an example of a receiver 100 comprising one or more interference detection devices 10, interference detection apparatuses 10, respectively.

In some examples two mixers 14, 16 are used, which are coupled. The output of the first mixer 14 is then input into the second mixer 16. For example, the multi-carrier signal then comprises two carriers. In such an example the second mixer 16 is a subsequent mixer and the first mixer 14 is a preceding mixer. The second mixer 16 is then configured to mix the first mixed signal (output of the first mixer) as the second mixed signal with the second oscillator signal to obtain or to output the auxiliary interference signal. The first mixed signal then is the second mixed signal input into the second mixer 16.

In other examples there may be more than two mixers 14, 16 in the sequence. The plurality of oscillator signals then comprises one or more additional or further oscillator signals having one or more additional or further local oscillator frequencies being adjusted to one or more additional or further carrier frequencies of the multi-carrier receive signal. The interference detection device 10 then further comprises one or more intermediate mixers 15, e.g. subsequent to the first mixer 14 and preceding to the second mixer 16, between the first mixer 14 and the second mixer 16, respectively. The one or more intermediate mixers 15 are configured to mix the first mixed signal with at least one of the additional or further oscillator signals and to provide a resulting signal as an input for the second mixer a subsequent mixer. In examples there can be a chain or sequence of multiple mixers, depending on system properties, e.g. the number of carriers aggregated, the presence of interferers is a system band, etc.

Figure 2:
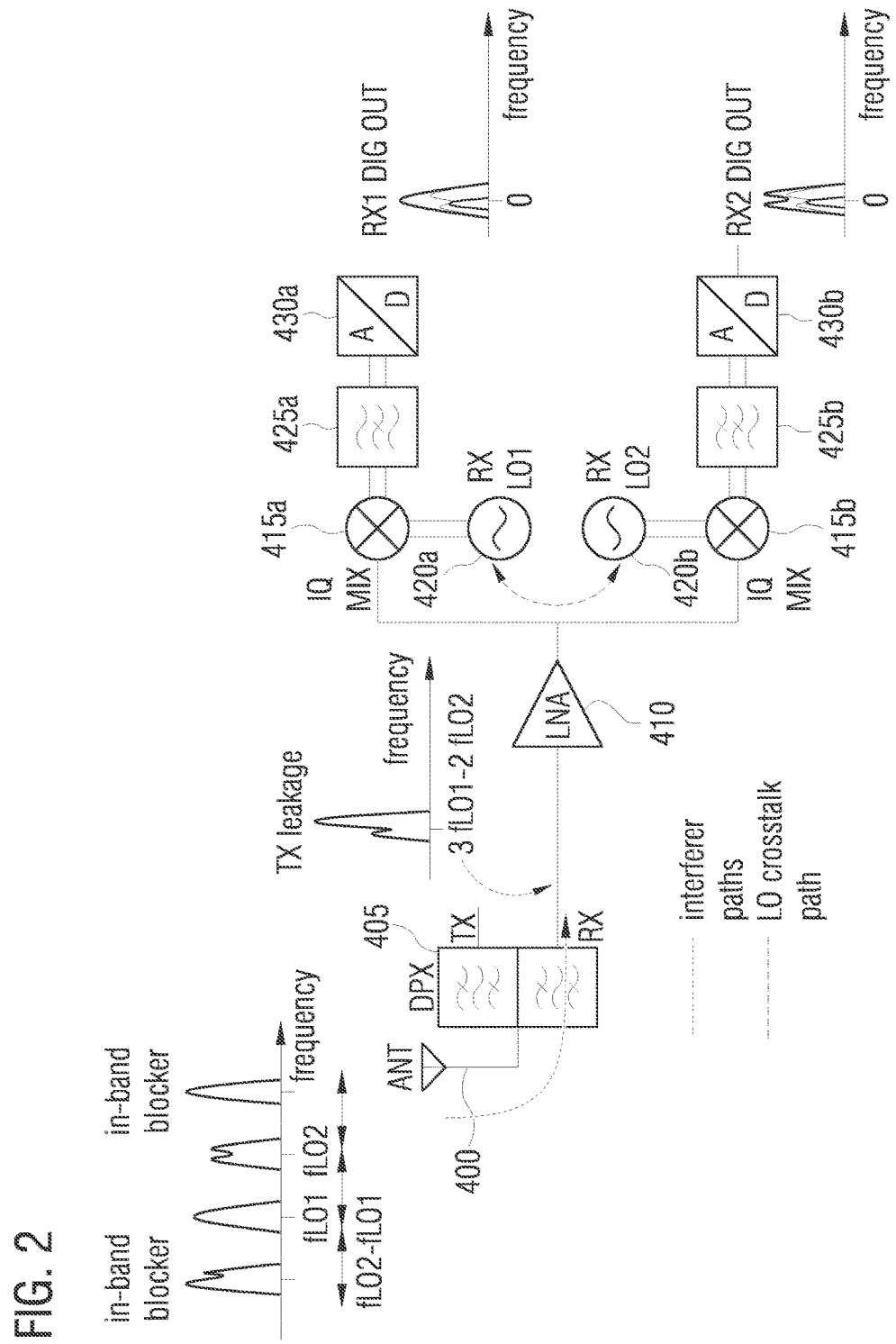
FIG. 2 shows an example of modulated interferers in a carrier aggregation receiver.

FIG. 2 shows an example of modulated interferers in a carrier aggregation receiver. As illustrated in FIG. 2 on the left hand side, a system is assumed to use two carrier frequencies fLO1 and fLO2. The spectrum depicted on the left further illustrates two interferers (in-band blockers), which have a frequency separation of |fLO2−fLO1| from the respective frequencies fLO1 and fLO2. FIG. 2 illustrated a receiver signal processing chain with a receive antenna 400 at the left with a subsequent Duplexer (DPX) 405. The DPX 405 separates transmit (TX) and receive (RX) paths, however, the DPX is not ideal and some of the TX power may leak into the RX path. Assuming the DPX 405 not to be ideal is an example, there could be other components in the signal processing paths causing such power leakage, too. Moreover, the DPX 405 is assumed to have bandpass characteristics (RX band is directed to RX path, TX band is directed to antenna but blocked from RX path).

In FIG. 2 the interferer path and the power leaking from TX are indicated by dotted lines. As indicated by the small viewgraph the TX frequency, which leaks, is assumed to correspond to |3fLO1−2fLO2|, i.e. an harmonic. All signals, the wanted signal, the interference and the leaking signal are then input into a Low Noise Amplifier (LNA) 410 before being mixed by the mixers 415a and 415b, IQ mixers (Inphase, Quadrature) in this example. The mixers 415a and 415b are coupled to two Local Oscillators (LO1, LO2) 420a and 420b, which generate oscillating signals at the frequencies fLO1 and fLO2. Due to imperfections in the components there is crosstalk, i.e. some signal power from one oscillator is coupled into the other oscillator path and vice versa. The crosstalk is indicated by a broken line in FIG. 2.

The output of the mixers 415a and 415b is then low pass filtered by the two filters 425a and 425b in order to suppress unwanted signals at higher frequencies. The output of the filters is then input into Analog/Digital (A/D) converters 430a and 430b before further processing.

Because of the interference, power leakage from the transmission band and the crosstalk, there are other signal components and intermodulation products which get transferred or converted into the baseband as indicated by the two baseband viewgraphs on the right of FIG. 2. As can be seen in the upper path the signal with fLO1 gets down-converted to the baseband. However, due to the crosstalk, some signal components of fLO2 get also down-converted, as well as components from the in-band blockers. For a particular pair of LO frequencies in a two-Carrier Aggregation (CA) case, RF interferers lying in the vicinity of any frequency of the form fLO1+k*(fLO1−fLO2) or fLO2+k*(fLO1−fLO2), with k being an integer number, may become down-converted to the baseband of receive chain 1 or 2, respectively, potentially masking a weak wanted signal in that path.

CW spurs originating from mixing of pure LO harmonics can be cancelled in the digital front end of the RF receiver by means of COordinate Rotation DIgital Computer (CORDIC)-based spur cancellers, which are functionally equivalent to sharp notch filters, whose parameters are adjusted by exploiting knowledge of the LO frequencies. Conversely, cancellation of modulated spurs is a much more complex task since in addition to the particular LO spur generation law, both carrier frequency and IQ modulation waveforms of the RF interferer need to be known. Such knowledge may be obtained by an example of the interference detection device 10.

Handling of modulated spurs in a CA case may be considered a non-trivial undertaking. Some concepts are based on feedforward interference cancellation principles or on methods, in which the mode of operation of the receiver is changed from zero-IF to low-IF. The low-IF approach may have the drawback that it may not work for all interference scenarios and in general may require a high Analog-to-Digital Conversion (ADC) sampling rate for desired signals with a wide bandwidth. For the cancellation of modulated spurs in a feedforward way an adaptive digital cancellation system may be used. This system may require reference signals of each interferer, whereas the degree of cancellation may dependent on the Signal-to-Noise Ratio (SNR) or Interference-to-Noise-Ratio (INR) of the reference. In addition the particular LO spur generation law, both carrier frequency and IQ modulation waveforms of the RF interferer may need to be known.

Figure 3:
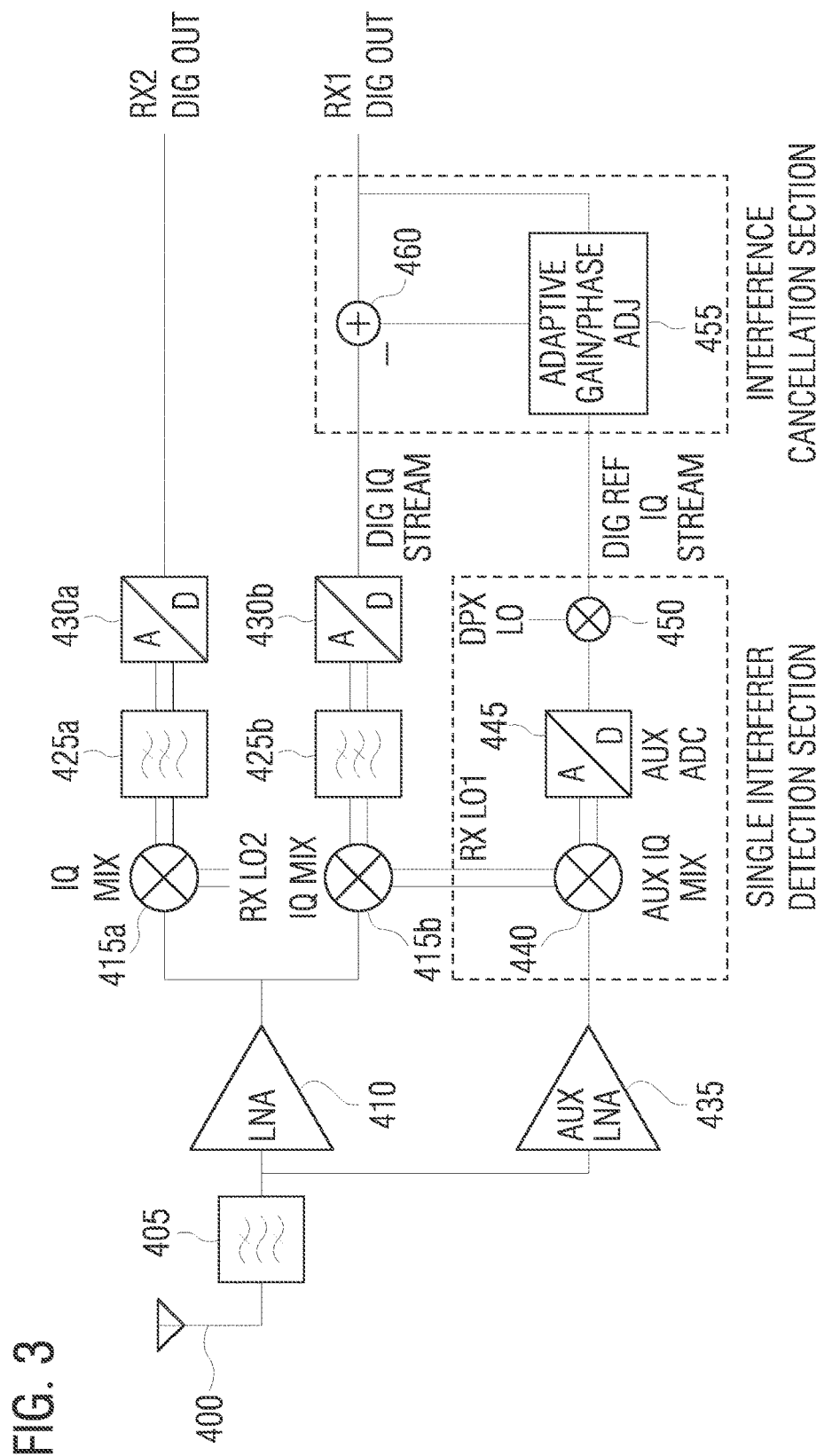
FIG. 3 illustrates an example of Tx modulated interferers.

FIG. 3 illustrates an example of Tx modulated interferers. FIG. 3 illustrates a receiver structure with the main path, as illustrated in FIG. 2 (similar reference signs indicate similar or equal components), and an auxiliary path. In the auxiliary path the receiver structure of FIG. 3 comprises an auxiliary LNA 435 and an auxiliary IQ-mixer 440, which mixes the output signal of the auxiliary LNA 435 with a locally generated oscillating signal of frequency LO1. Its output is then A/D converted by the converter 445 before being mixed with the duplex frequency DPX LO by mixer 450. This section may detect a single interferer having the duplex frequency and subsequent phase/gain adjustment may cancel this interferer from the output of the A/D converter 430b in the lower main receiver branch. The latter section may also be referred to as interference cancellation section, having a processor 455 and a summation element 460.

FIG. 3 shows a block diagram of a modulated spur cancellation system for cancelling modulated TX interference in Frequency Division Duplex (FDD) transceivers. The system comprises an analog detector 440, which down-converts the TX interferer to an IF frequency equal to the duplex offset, a high speed AD converter 445, and a digital section, where further down-conversion 450, interference level estimation 455 and final subtraction 460 from the main receive chain data stream occurs. By using just one LO signal in the detector and relying on the knowledge of the duplex offset frequency, the detection method is limited to cancelling modulated spurs originating from TX interference at the known frequency.

Examples may enable interference detection of a broader class of interferers potentially causing spurious distortion but without a-priori knowledge of their exact carrier frequencies. Examples may also relax requirements for auxiliary A/D converters as will be detailed subsequently.

Figure 4:
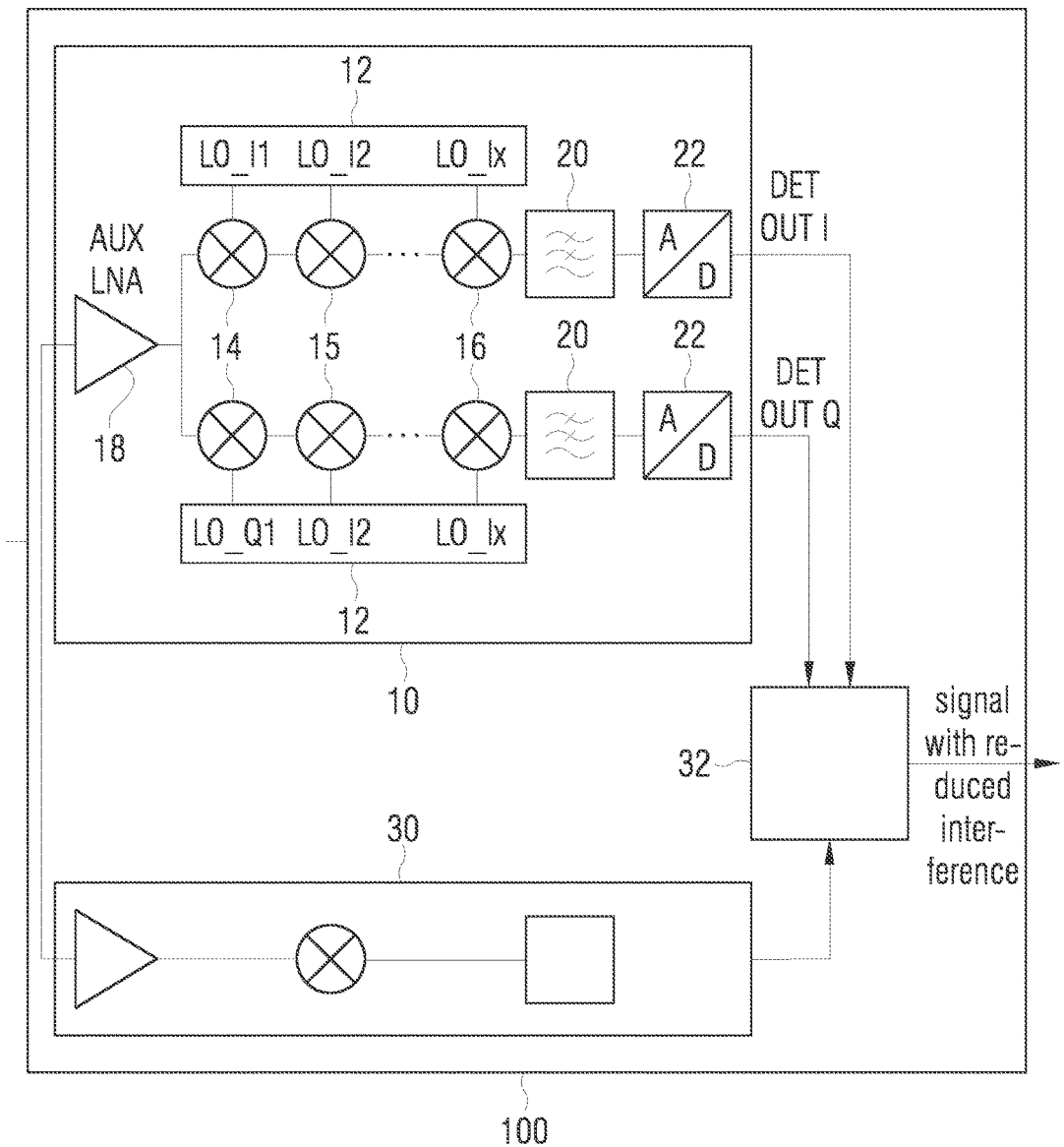
FIG. 4 illustrates an example of an interference detection device.

FIG. 4 illustrates an example of an interference detection device 10 in line with the example described in FIG. 1. The example shown in FIG. 4 further comprises an LNA 18 to provide the multi-carrier receive signal to the first mixer 14, which in this example, is also implemented as an IQ mixer. The interference detection device 10 further comprises one or more intermediate mixers 15 subsequent to the first mixer 14 and preceding to the second mixer 16 in this example, between the first mixer 14 and the second mixer 16, respectively. The one or more intermediate mixers 15 are configured to mix an output signal of a preceding mixer (e.g. the first mixed signal of mixer 14) with at least one of the further oscillator signals and to provide a resulting signal as input for a subsequent mixer (e.g. the second mixed signal as input for the second mixer 16). The first mixed signal then is the second mixed signal input into the second mixer 16. Generally in examples, at least one mixer 14, 15, 16 may comprise an inphase (I) mixing stage and a quadrature (Q) mixing stage to provide an inphase and a quadrature output signal. In the example depicted in FIG. 4 the first mixer 14 is provided with IQ oscillator signals of frequency LO_I 1 and LO_Q 1, while the subsequent mixers 15, . . . , 16, are implemented as IQ-mixers but provided with inphase oscillator signals LO_I 2, . . . , LO_I x. The generator 12 is shown in two parts in FIG. 4 for ease of illustration. The generator 12 can, in general examples, be composed of one or multiple devices, units, modules, circuits etc.

The generator 12 is configured to generate at least one oscillator signal having an inphase component signal and a quadrature component signal, which is the one with LO_I 1 and LO_Q 1 in the example of FIG. 4. As further shown in FIG. 4 the output of the sequence of mixers is then low pass filtered by the filters 20 before being A/D converted by converters 22. In the example, the interference detection device 10 further comprises a low pass filter 20 configured to low pass filter an output signal of a last subsequent mixer in the chain (the second mixer 16) to obtain or to output the auxiliary interference signal. The determined auxiliary signal in the example is also an IQ-signal DET OUT I and DET OUT Q. Furthermore, the interference detection device 10 comprises the analog-to-digital converter 22 configured to digitize the auxiliary interference signal. The receiver 100 may be configured to reuse the oscillator signals generated by the generator 12 for the interference detection device 10 or by the generating means 12 for the interference detection apparatus and the parallel receiver processing chain 30.

Examples may provide the ability to detect harmful RF interferers (i.e. such interferers which may be down-converted to baseband due to mixing with a spurious LO tone) without prior knowledge of their carrier frequencies. Examples may provide the ability to provide baseband reference signals for adaptive digital cancellation centered at exactly the same low-IF carrier (or DC (Direct Current) in a special case) as the troublesome spur in the main RX path. In examples the interference detection device 10 may reuse active local oscillator signals. Examples might not need a dedicated synthesizer and sweeping its frequency, which could introduce further spurious products. Since the relevant signals at the detector output are in baseband, low pass filtering can be applied in front of the auxiliary AD converter 22, relaxing its dynamic range, speed and power consumption requirements.

FIG. 4 shows a block diagram of an example of an RF interference detection device 10, a receiver 100 comprising the detection device 10, respectively. It forms an auxiliary receive path 10 operating in parallel to a main receive path 30 and performs mixing of incoming RF signals with all active LO signals in a serial fashion.

Each mixer pair in the chain is driven by pulsed LO signals having in principle both odd and even harmonics. The pulsed LO waveforms are obtained from main LO signals with the help of e.g. a Delay-Locked-Loop (DLL). Duty cycle of the pulses can be adjusted to boost levels of LO harmonics on demand. Alternatively, two parallel detectors, driven with LO pulses having different duty cycles can be used to widen range of harmonic combinations having significant power. At least one mixer within a pair is driven by quadrature LO pulses. Potentially, in further examples, multiple pairs of mixers may be driven with IQ oscillator signals. After the mixing chain, low-pass filters select only low-frequency signal components, which are subsequently digitized and used for further refined detection and/or cancellation tasks.

FIG. 4 shows a block diagram of an example of the proposed RF interference detection system 10 in a receiver 100. In the example depicted in FIG. 4 the receiver 100 further comprises a parallel receiver processing chain 30 configured to process the multi-carrier receive signal in parallel to the interference detection device 10 or apparatus 10. As indicated in FIG. 4 the parallel receiver processing chain 30 may comprise similar components, e.g. one or more LNAs, one or more mixers, one or more filters etc. The receiver 100 also comprises a signal processor 32 configured to process a baseband output signal of the parallel receiver processing chain 30 based on the auxiliary interference signal to reduce interference in the baseband output signal.

The auxiliary receive path in the device 10 operates in parallel to the main receive path 30 and performs mixing of incoming RF signals with multiple and potentially all active LO signals in a serial fashion. Each mixer pair 14, 15, 16 in the chain is driven by pulsed LO signals having in principle both odd and even harmonics. In this example the generator 12 is configured to generate pulsed oscillator signals having odd and even harmonics. Furthermore, at least one pulsed oscillator signal comprises quadrature pulses, which is the oscillator signal for the first mixer 14 in the example with the component signals LO_I 1 and LO_Q 1. The other mixers 15, 16 are provided with inphase components of the respective oscillator signals, LO_I 1 2, . . . , LO_I x. The pulsed LO waveforms are obtained from main LO signals with the help of e.g. a Delay-Locked-Loop (DLL). The generator 12 is configured to generate pulsed oscillator signals from sinusoidal oscillator signals using a delay-locked-loop.

A duty cycle of the pulses can be adjusted to boost levels of LO harmonics on demand. In this example the generator 12 provides adjustable boost levels for harmonics. Alternatively, two parallel detectors 10, driven with LO pulses having different duty cycles can be used to widen the range of harmonic combinations having significant power. In another example, the receiver 100 hence comprises two or more interference detection devices 10 or two or more interference detection apparatuses 10. The two or more interference detection devices 10 or two or more interference detection apparatuses 10 use pulsed oscillator signals having different duty cycles.

Coming back to the example shown in FIG. 4, at least one mixer 14 within a pair is driven by quadrature LO pulses. After the mixing chain, low-pass filters 20 select only low-frequency signal components, which are subsequently digitized 22 and used for further refined detection and/or cancellation tasks. The signal processor 32 is configured to perform adaptive interference cancellation in the baseband output signal. Since phase shifts between harmonics of the quadrature (LO_I 1 and LO_Q 1) signals are equal to $n*(pi/2)$, where n is the harmonic number, the system might not provide quadrature baseband outputs for interferers lying close to even-only LO harmonic combinations. However, as already mentioned above, the problematic combinations may always entail odd and even LO harmonic combinations; thus, from a practical point of view, the limitation might not be considered serious.

FIG. 4 shows a block diagram of an example interferer detection system 10. The system 10 mixes the incoming signal with all harmonic combinations of active LO signals. Those LO harmonic combinations which cause modulated spurs to land in baseband are inherently reproduced by this detector 10. Therefore, the modulated spurs are down-converted at exactly the same IF frequency as in the main path. The system can also be used as a reference signal generator for an adaptive digital interference cancellation system. Unfortunately, the system can only be used in cases where there is only one dominant interferer. This limitation results due to the fact that all signals situated in one of the sensitive bands, cf. FIG. 2 are down-converted and therefore are unrecoverably combined.

FIG. 5 shows a transistor-level schematic diagram of the analog section of an example of the detector in two-CA case, comprising only simple inverter and passive Metal-Oxide-Semiconductor (MOS) switches. As such, it is especially suitable for implementation in deep-submicron complementary (CMOS) technologies. FIG. 5 illustrates an LNA 18, which is implemented as a push-pull stage using MOS Field Effect Transistors (FET). The mixers 14 and 16 are also implemented as MOSFETs coupled with capacitors (Alternating Current (AC) coupling). Another set of capacitors then serves as low pass filter 20. The signals shown at the bottom of FIG. 5 illustrate the IQ pulsed signals LO_I 1 and LO_Q 1 input into the first mixer 14. The prime role of some examples may be making the RF receiver alert of a potential spurious distortion. Its role as a reference signal generator for adaptive digital interference cancellation may, in some cases, be limited to cases when there is only one dominant interferer situated in one of the sensitive bands. The reason is that the examples presented above down-convert to baseband signals lying in all sensitive bands, see FIG. 2, irrespective of whether all or just some of them are down-converted in the main RX paths due to cross-talk effects.

Moreover, conversion gains associated with different bands are generally different in the main and detector's receive paths. If more interferers are present at the antenna, then the an example detector can at least be used as a triggering block for more sophisticated and power consuming reference signal generation methods (e.g. employing wideband AD converters and spectrum analyzing digital algorithms).

Figure 6:
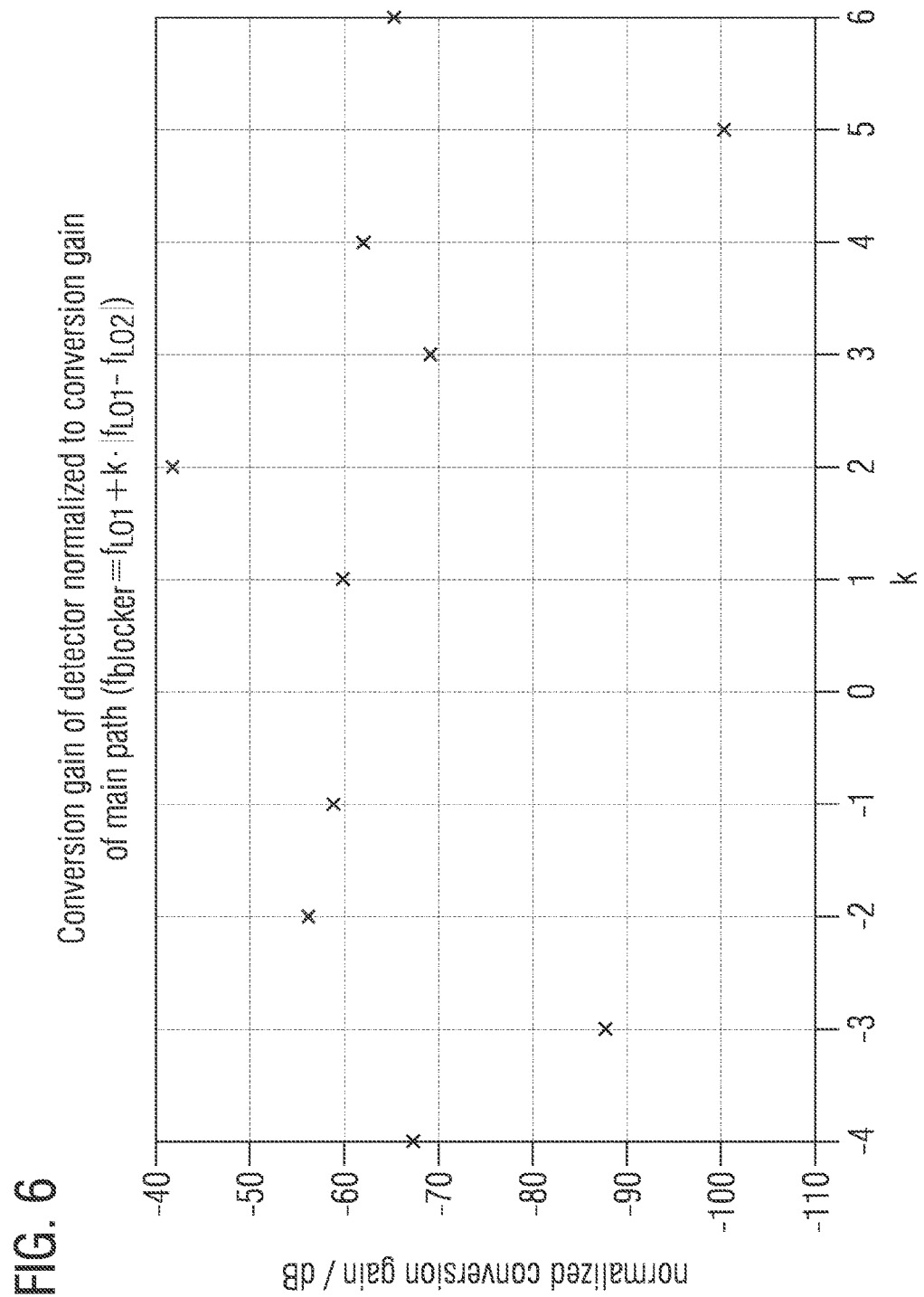
FIG. 6 shows measurement results in an example.

A demonstrator of the proposed detector has been implemented in a test chip. The first mixer 14 in the detector chain 10 is driven by the LO signal having only odd harmonics. Moreover, no dedicated preamplifier and AC coupling between stages was added to the circuit. FIG. 6 shows measurement results in an example. FIG. 6 summarizes conversion gains of the detector from frequencies equal to various LO harmonic combinations down to DC, normalized to the conversion gain of the wanted signal in the main receive path. For reference, conversion gain of −60 dB generates a signal (at the detector output) equal to the modulated spur (at the mixer output in the main RX chain) due to a −60 dBc spur in the mixing LO waveform. This is close to achievable crosstalk isolation, while $3^{rd}$ Generation Partnership Project (3GPP) sensitivity specifications call for spurious tone levels as low as −80 or 90 dBc. In the proper implementation, gain of the detector chain can be improved by using a dedicated pre-amplifier. The LO harmonic combinations shown in FIG. 6 have been chosen according to the already mentioned building law fLO1+k*(|fLO1−fLO2|) with k={−4, −3, −2, −1, 0, 1, 2, 3, 4, 5, 6}, fLO1=2137.5 MHz and fLO2=2142.5 MHz.

Figure 7:
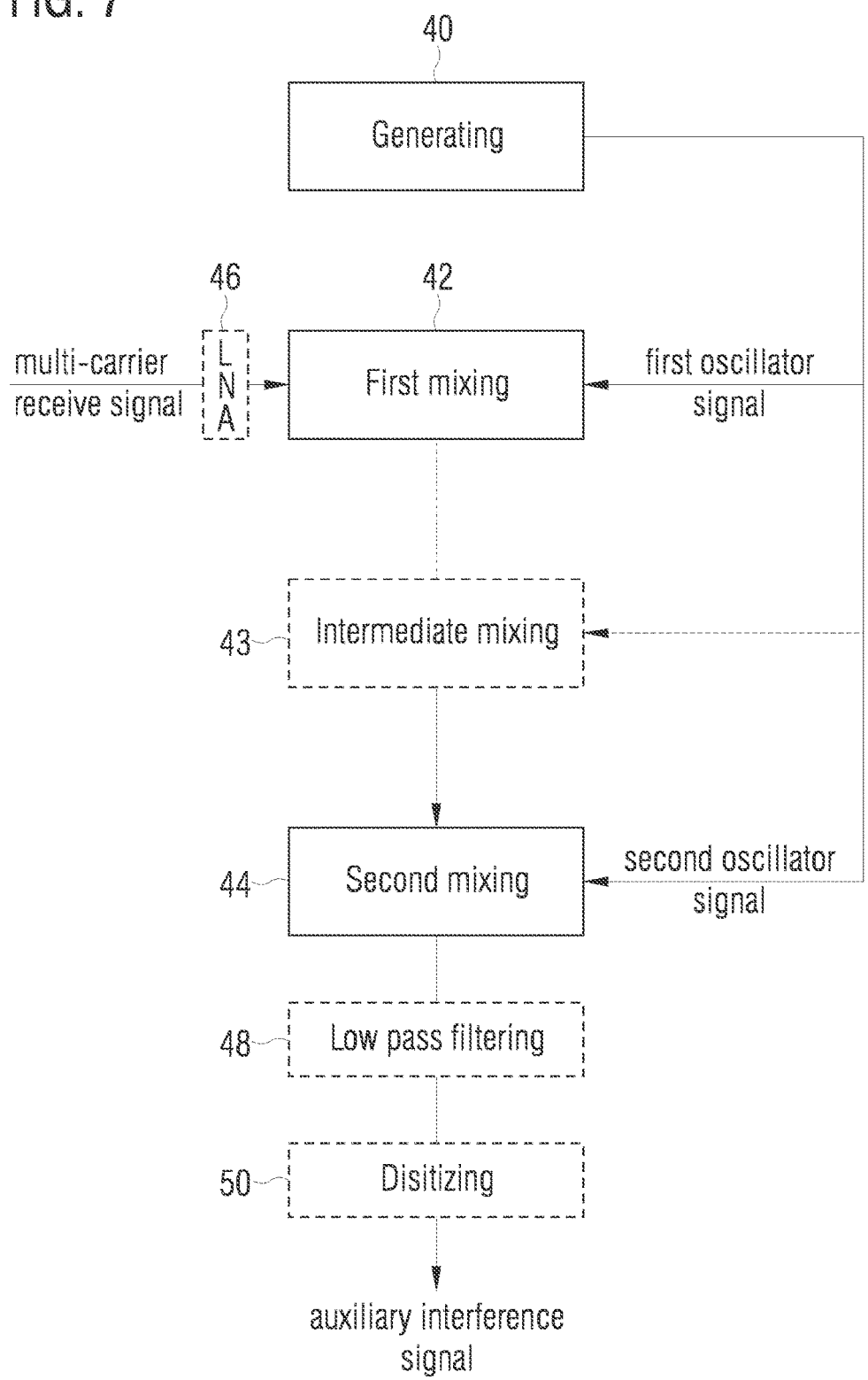
FIG. 7 shows a block diagram of an example of a method for detecting interference.

FIG. 7 shows a block diagram of an example of a method for detecting interference. The interference detection method is configured for generating an auxiliary interference signal for a multi-carrier receive signal. The method comprises generating 40 a plurality of oscillator signals. The plurality of oscillator signals comprises at least a first oscillator signal with a first local oscillator frequency. The first local oscillator frequency may be adjusted to a first carrier frequency of the multi-carrier receive signal. The plurality of oscillator signals further comprises a second oscillator signal with a second local oscillator frequency. The second local oscillator frequency may be adjusted to a second carrier frequency of the multi-carrier receive signal. The method further comprises first mixing 42 the multicarrier receive signal with the first oscillator signal to output a first mixed signal. The method further comprises second mixing 44 a second mixed signal with the second oscillator signal to obtain or to output the auxiliary interference signal.

The first mixed signal may be used or input as the second mixed signal for the second mixing 44. The second mixing 44 may be the subsequent mixing and the first mixing 42 may be the preceding mixing, for example in a two-CA case. The second mixing 44 may then comprise mixing the input signal for the subsequent mixing (the first mixed signal) with the second oscillator signal to obtain or to output the auxiliary interference signal. In further examples, the plurality of oscillator signals may comprise one or more additional or further oscillator signals having one or more additional or further local oscillator frequencies, which are adjusted to one or more additional or further carrier frequencies of the multi-carrier receive signal. The interference detection method then further comprises one or more intermediate mixings 43 between the first mixing 42 and the second mixing 44. The one or more intermediate mixings 43 may comprise mixing the first mixed signal with at least one of the additional or further oscillator signals and providing a resulting signal as input for the second mixing 44. The intermediate mixing is indicated in FIG. 7 by the broken line, as being optional for examples.

As further shown in FIG. 7, optionally, further examples may comprise low noise amplifying 46 for providing the multi-carrier receive signal. At least one mixing 42, 43, 44 may comprise inphase mixing and quadrature mixing for providing an inphase and a quadrature output signal. The generating 40 may comprise generating at least one oscillator signal having an inphase component signal and a quadrature component signal. The generating 40 may comprise generating pulsed oscillator signals having odd and even harmonics. At least one pulsed oscillator signal may comprise quadrature pulses.

In further examples the generating 40 may comprise generating pulsed oscillator signals from sinusoidal oscillator signals using a delay-locked-loop. The generating 40 may provide adjustable boost levels for harmonics. As further shown in FIG. 7 another example method may comprise low pass filtering 48 an output signal of a last subsequent mixing to obtain or to output the auxiliary interference signal. The method may further comprise analog-to-digital converting 50 for digitizing the auxiliary interference signal.

Another example is a computer program having a program code for performing at least one of the methods described herein, when the computer program is executed on a computer, a processor, or a programmable hardware component. Another example is a machine readable storage including machine readable instructions, when executed, to implement a method or realize an apparatus as described herein. A further example is a machine readable medium including code, when executed, to cause a machine to perform any of the methods described herein.

FIG. 8 shows examples of a mobile terminal and a base station comprising an example receiver 100a, 100b, respectively. A further example is a radio receiver 200, 300 comprising an example of the above-described receiver 100. Another example is a mobile terminal 200 comprising the radio receiver 100a or a base station 300 comprising the radio receiver 100b. As shown in the mobile communication system depicted in FIG. 8.

FIG. 8a shows an example of a receiver 100, 100a, 100b, as potentially used in a mobile terminal 200 or a base station 300. The receiver 100, 100a, 100b comprises an example of the above described apparatus 10 or device 10 to generate a baseband receive signal within the receiver 100, 100a, 100b. Further, the receiver 100, 100a, 100b comprises a baseband processor module 170 for further processing the baseband receive signal. Additionally, the receiver 100, 100a, 100b comprises a power supply unit 180 supplying at least the receiver or the transceiver 100, 100a, 100b and the baseband processor module 170 with power. In some examples, a cell phone may comprise a receiver or a transceiver comprising an apparatus or device for generating baseband signals according to the proposed concept or one or more examples described above.

The mobile communication system may correspond, for example, to one of the Third Generation Partnership Project (3GPP)—standardized mobile communication networks, where the term mobile communication system is used synonymously to mobile communication network. The mobile or wireless communication system may correspond to a mobile communication system of the 5th Generation (5G) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

A base station or base station transceiver 300 can be operable to communicate with one or more active mobile transceivers 200 and a base station transceiver 300 can be located in or adjacent to a coverage area of another base station transceiver, e.g. a macro cell base station transceiver or small cell base station transceiver. Hence, examples may provide a mobile communication system comprising one or more mobile transceivers 200 and one or more base station transceivers 300, wherein the base station transceivers 300 may establish macro cells or small cells, as e.g. pico-, metro-, or femto cells. A mobile transceiver 200 may correspond to a smartphone, a cell phone, user equipment, a laptop, a notebook, a personal computer, a Personal Digital Assistant (PDA), a Universal Serial Bus (USB)-stick, a car, etc. A mobile transceiver 200 may also be referred to as User Equipment (UE) or mobile in line with the 3GPP terminology.

A base station transceiver 300 can be located in the fixed or stationary part of the network or system. A base station transceiver 300 may correspond to a remote radio head, a transmission point, an access point, a macro cell, a small cell, a micro cell, a femto cell, a metro cell etc. A base station transceiver 300 can be a wireless interface of a wired network, which enables transmission of radio signals to a UE or mobile transceiver 200. Such a radio signal may comply with radio signals as, for example, standardized by 3GPP or, generally, in line with one or more of the above listed systems. Thus, a base station transceiver 300 may correspond to a NodeB, an eNodeB, a Base Transceiver Station (BTS), an access point, a remote radio head, a transmission point etc., which may be further subdivided in a remote unit and a central unit.

A mobile transceiver 200 can be associated with a base station transceiver 300 or cell. The term cell refers to a coverage area of radio services provided by a base station transceiver, e.g. a NodeB (NB), an eNodeB (eNB), a remote radio head, a transmission point, etc. A base station transceiver may operate one or more cells on one or more frequency layers, in some examples a cell may correspond to a sector. For example, sectors can be achieved using sector antennas, which provide a characteristic for covering an angular section around a remote unit or base station transceiver. In some examples, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

One option for the separation of down-converted, combined interferers is to feed the RF signal to an M-phase passive mixer, which is driven by non-overlapping clocks. Using these M baseband signals for some mathematical manipulations may enable the possibility to gather a set of M disentangled baseband signals with separated interferers. However, examples may generate reference signals for one or multiple dominant interferers in a CA scenario, enabling the possibility, of a cancellation of multiple modulated spurs with an adaptive digital interference cancellation system, which is supported with these reference signals, as will be detailed in the sequel.

Figure 9:
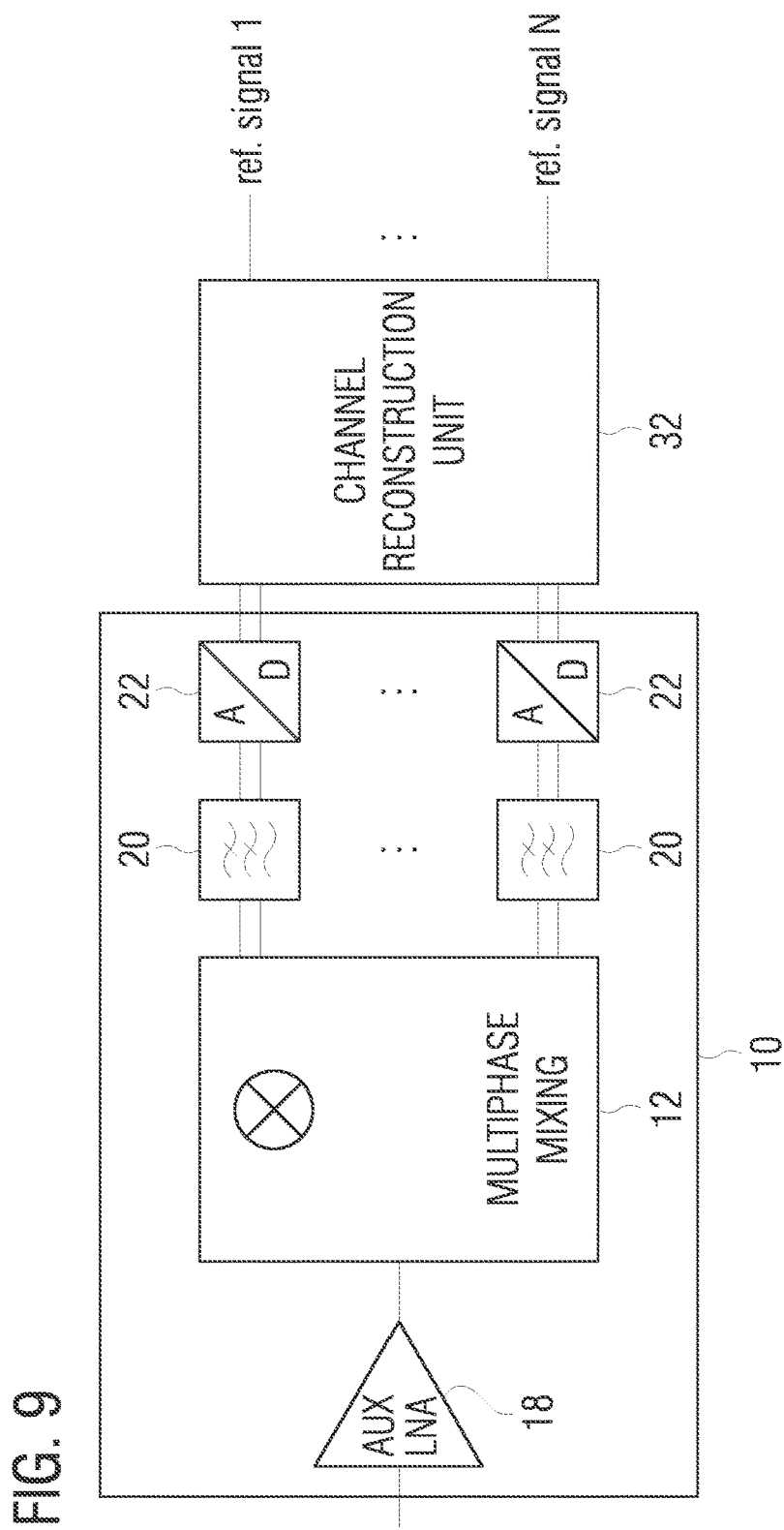
FIG. 9 shows an example of an interference detection device detecting multiple interferers.

FIG. 9 shows another example of an interference detection device 10 detecting multiple interferers. In the example of FIG. 9 the device 10 comprises an LNA 18, which is coupled to a multiphase mixing stage 14, 16 which outputs multiple auxiliary interference signals. The multiple auxiliary interference signals are the low pass filtered 20 and digitized 22. A signal processor 32 implements a channel reconstruction unit for reconstructing multiple interferers. The multiphase mixing stage 14, 16 comprises multiple mixing branches. As described above for an inphase and a quadrature mixing branch, the present example extends the concept by introducing additional or further mixing branches in which additional or further phase shifts are introduced to the oscillator signals. The multiple branches are gathered in the example shown in FIG. 8 in the multiphase mixing stage 14, 16.

It may be considered another finding of examples to provide a reference signal generator system which creates multiple baseband signals as a reference for modulated spurs located in bands sensitive to spurious down-conversion in carrier-aggregation receive modes. For example, an incoming signal is mixed with all harmonic combinations of active LO signals, reproducing all LO harmonic combinations that cause interferers to land in the baseband at exactly the same IF frequency as in the main receive path. For a separation in the digital domain the system phase shifts the modulated spurs dependent on the LO harmonic combination causing the modulated spur to land in the baseband. Examples may generate a reference signal of a harmful RF interferer (i.e. an interferer which may be down-converted to baseband due to mixing with a spurious LO tone) for an adaptive digital interference cancellation without prior knowledge of the carrier frequencies. Example may provide an ability to separate multiple RF interferers and provide their baseband reference signals to an adaptive digital interference cancellation system. As described above, an example of a reference signal generator or interference detection device 10 may reuse active local oscillator signals. Examples might not use a dedicated synthesizer and sweeping its frequency, which could introduce further spurious products. Since the relevant signals at the detector output are in baseband, at least in some examples, low pass filtering 20 can be applied in front of the auxiliary AD converter 22, relaxing its dynamic range, speed and power consumption requirements.

FIG. 9 shows a block diagram of another example of a reference signal generator or interference detection device 10. It comprises an auxiliary receive path operating parallel to the main receiver, similar to what was described with respect to FIG. 4. The multiphase mixing stage 14, 16 down-converts the incoming RF signal in a serial fashion and phase shifts modulated spurs dependent on the phase of the LO signals and on the LO harmonic combination causing the down-conversion to the baseband. After the mixing stage 14, 16, only low-frequency signals are selected by low-pass filtering 20 and are then subsequently digitized 22. Finally, the channel reconstruction unit 32 generates the N reference signals (auxiliary interference signals) by mathematically disentangling of the digitized baseband signals, which is possible due to the different phase shifts of the interferers caused by the multiphase mixing stage.

Figure 10:
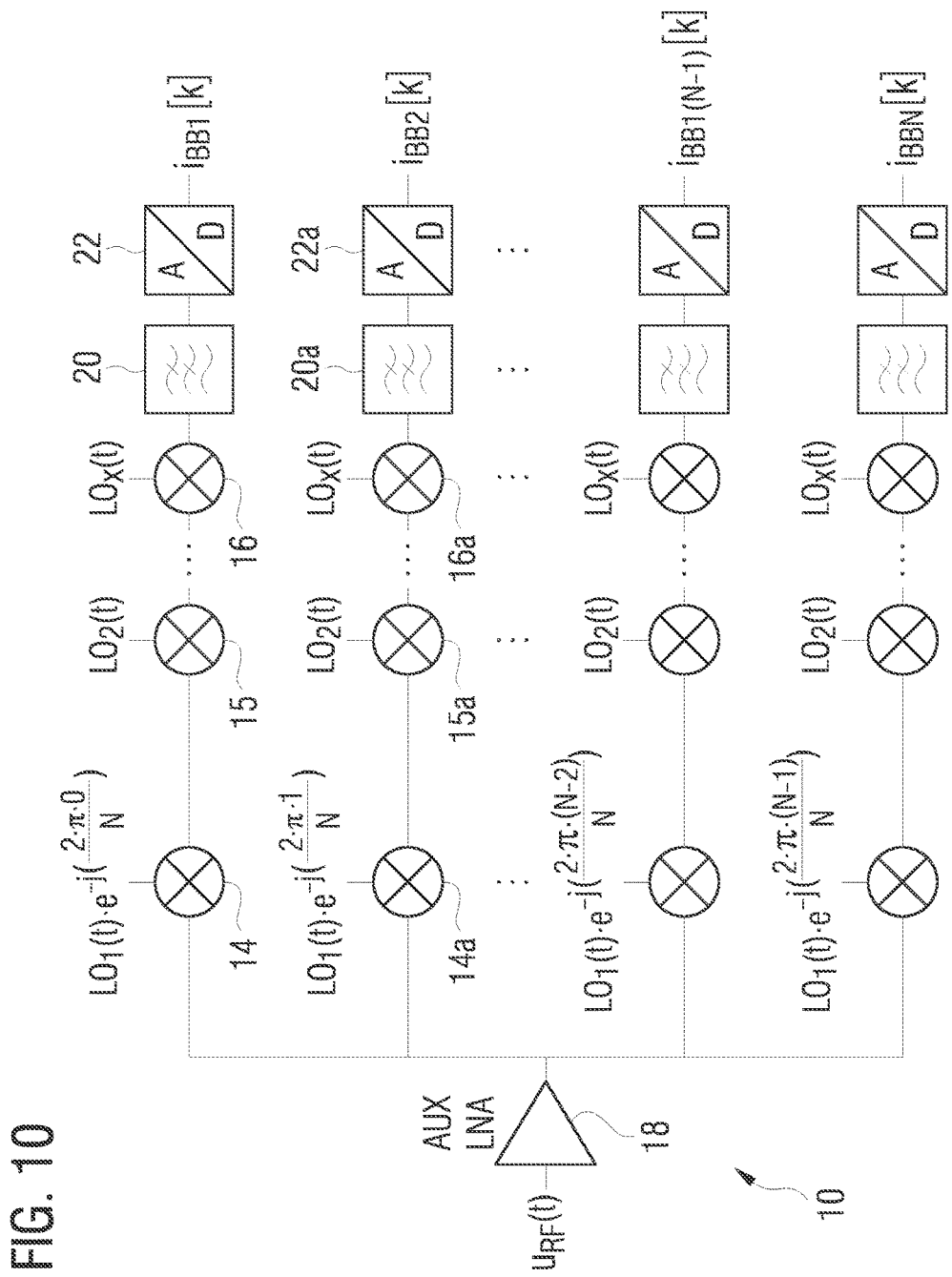
FIG. 10 depicts an example with multiple phase shifted mixing branches.

FIG. 10 depicts an example with multiple phase shifted mixing branches in more detail. The signal output by the LNA 18 is input into multiple mixing branches, each comprising multiple subsequent mixers, a low pass filter and an A/D converter. In the example shown in FIG. 10 the plurality of subsequent mixers corresponds to a first mixing branch (mixers 14, 15, 16, low pass filter 20 and converter 22), which outputs a first auxiliary interference signal $i_{BB1}[k]$. The interference detection device 10 comprises at least a second mixing branch (mixers 14a, 15a, 16a, low pass filter 20a and converter 22a), which comprises an additional or further plurality of subsequent mixers 14, 16. The first additional or further mixer 14a is configured to mix the multicarrier receive signal with a version of the first oscillator signal to output an input signal for a subsequent further mixer 15a, a first additional mixed signal, respectively. A second further mixer 16a is configured to mix an output of a preceding mixer (the first mixed signal) with a version of the second oscillator signal to obtain a further auxiliary interference signal $i_{BB2}[k]$. In the example shown in FIG. 10 there are additional or further mixing branches outputting additional or further auxiliary interference signals $i_{BB(N-1)}[k]$, $i_{BBN}[k]$. Hence, in this example there are N parallel mixing branches.

FIG. 10 shows a detailed block diagram of the multiphase mixing stage. After the LNA 18, the RF signal is fed to N paths where each path performs mixing of the incoming RF signal with all active LO signals in a serial fashion, whereas the LO signal of the first mixers 14, 14a, etc. in each branch are phase shifted by $(2 \cdot \pi \cdot m)/N$. N is the number of parallel paths and m is the number of the current path ($m \in [0; N-1]$). These phase shifts of the LO signal of the first mixers 14, 14a, etc. cause the modulated spurs to be shifted dependent on the LO harmonic combination causing the down-conversion to the baseband. In this example, the version of the first oscillator signal $LO_1(t)$ $\exp(-j(2*pi*(m))/N)$ ($m \neq 0$) is a phase shifted version of the first oscillator signal $LO_1(t)$ ($m=0$). At least one oscillator signal is used with three or more different phase shifts in the three or more parallel mixing branches.

Additionally or alternatively the version of the second oscillator signal may be a phase shifted version of the second oscillator signal. In other words, in further examples the second or any subsequent mixers 15, 15a, etc. or 16, 16a, etc. in each branch may use phase shifted versions of the respective oscillator signal to generate more phase combinations and increase the number of detectable interferers. An example may hence comprise three or more parallel mixing branches, each of at least two subsequent mixers. At least two oscillator signals may be used with different phase shifts in the three or more parallel mixing branches.

As can be further seen from the example depicted in FIG. 10 the at least one oscillator signal is used with evenly distributed phase shifts $(\exp(-j(2*pi*(m))/N))$ in the three or more parallel mixing branches. In an example using phase shifted versions in multiple subsequent paths, at least two oscillator signals may be used with evenly distributed phase shifts in the three or more parallel mixing branches. The number of phase shifted versions of the first oscillator signal may differ from a number of phase shifted versions of the second oscillator signal.

Figure 11:
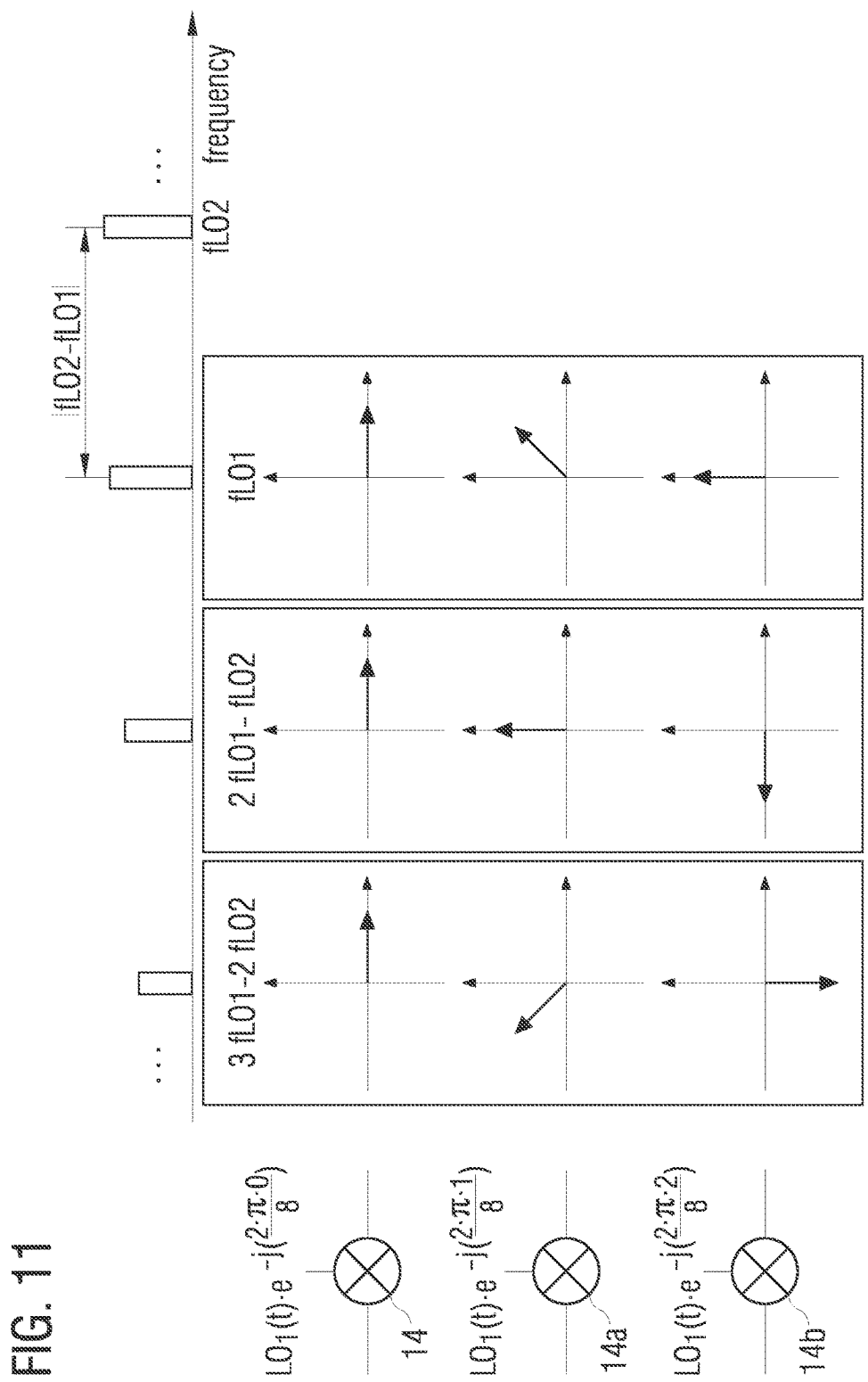
FIG. 11 illustrates different phase relations in an example.

FIG. 11 illustrates different phase relations in an example. FIG. 11 shows on the very left three first mixers 14, 14a, and 14b of three parallel branches in an example having eight parallel mixing branches in total. The three mixers 14, 14a, 14b are assumed to be the respective first mixers in each branch. A shown in the example the mixers are provided with phase shifted versions of the oscillator signal $LO_1(t)$, where the phase shifts in FIG. 11 are $(\exp(-j(2*pi*(m))/8))$ for m=0, 1, 2. FIG. 11 further illustrates phase shifts introduced to harmonics under these circumstances. On the very right there is a phase diagram for fLO1, hence the basic frequency with the above phase shifts, 0, pi/4, pi/2. In the center of FIG. 11 there are phase diagrams for 2fLO1−fLO2 (with phase shifts of 0, pi/2, pi) and 3fLO1−2fLO2 (with phase shifts 0, 3pi/4, 3pi/2). FIG. 11 shows the phase shifts for the first, second and third harmonic of the LO1 signal in a 2CA case with eight parallel paths. Each mixer pair in the chain is driven by pulsed 25% duty cycle LO signals having odd and even harmonics. The LO waveforms are obtained from main LO signals with the help of e.g. Delay-Locked-Loop (DLL).

In an example of a corresponding receiver 100, the receiver 100 comprises the multiple parallel mixing branches generating multiple auxiliary interference signals. The signal processor 32 is configured to process multiple auxiliary interference signals to determine two or more separated interference signals for subsequent interference cancellation. The channel reconstruction unit 32 calculates N reference signals representing the disentangled interferers. This calculation is performed like the calculation of the coefficients of a Discrete Fourier Series (DFS). The signal processor 32 is configured to determine the two or more separated interference signals using a discrete Fourier series derivation based on three or more auxiliary interference signals.

For each coefficient only the interferer with a certain frequency over the N baseband signals is extracted (The DFS is not performed over time but over the N baseband signals).

Figure 12:
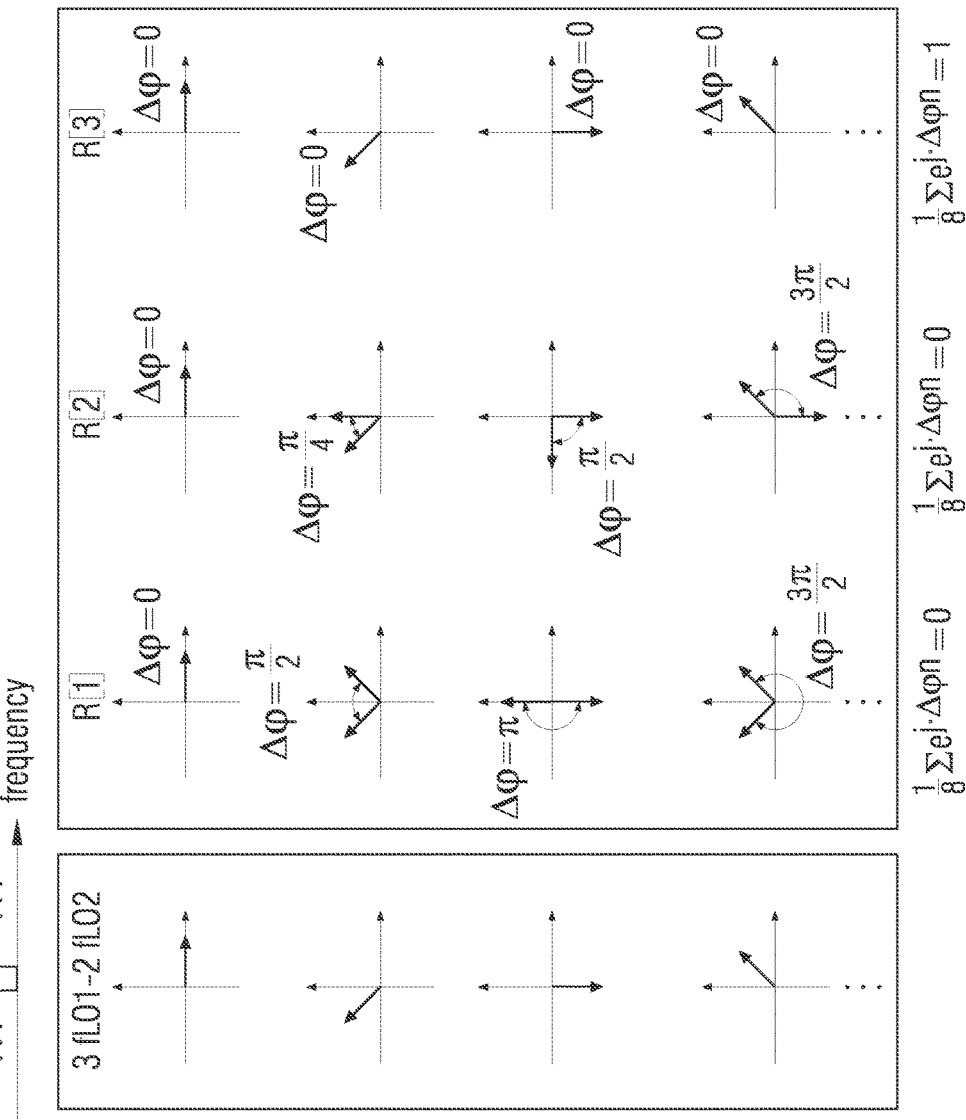
FIG. 12 illustrates separation of different interferers in an example.

FIG. 12 illustrates separation of different interferers in an example. FIG. 12 illustrates extraction for a reference signal of a modulated spur down-converted due to the third harmonic of LO1 in a 2CA case with eight parallel paths. This reference signal is only extracted with the calculation of the third coefficient. Therefore, the x Fourier Series coefficient corresponds to the interferer down-converted due to the x harmonic of LO1. On the left hand side FIG. 12 shows the mixers 14, 14a, 14b, and 14c, with the corresponding phase shifts of $LO_1(t)$, $(2*pi*(m)/8)$ for m=0, 1, 2, 3 and together with the phase diagrams as introduced in FIG. 11 for the first three Fourier coefficients R[1], R[2], R[3].

In the digital domain the wanted reference signals can then be retrieved by using the following equation:

$$R_k[n] = \frac{1}{N} \cdot \sum_{m=0}^{N-1} i_{BBm}[n] \cdot e^{-j\frac{2\cdot\pi\cdot m\cdot k}{N}} \quad (1)$$

$R_k[n]$ is the interferer down-converted due to the k harmonic of $LO_1$ and $i_{BBm}[n]$ is the m digitized low frequency signal. $i_{BBm}[n]$ can be expressed as in (2).

$$i_{BBm}[n] = G \cdot \sum_{b=1}^{B} a_b[n] \cdot \prod_{l=1}^{L} C[h_l[b]] \cdot e^{j\frac{2\cdot\pi\cdot m\cdot h_1[b]}{N}} \quad (2)$$

G is the gain of the AUX LNA, $a_b[n]$ is the interferer b, $h_l[b]$ is the $h_l[b]$ harmonic of $LO_l$ which causes the down-conversion of the interferer b. $C[h_l[b]]$ is the Fourier coefficient of the $h_l[b]$ harmonic of $LO_l$. B is the number of interferers and L is the number of LO signals. Substituting (2) in (1) leads to:

$$R_k[n] = \frac{1}{N} \cdot \sum_{m=0}^{N-1} \sum_{b=1}^{B} G \cdot a_b[n] \cdot \prod_{l=1}^{L} C[h_l[b]] \cdot e^{-j\frac{2\cdot\pi\cdot m(k-h_1[b])}{N}}$$

For $k = h_1[x]$ and $|h_1[y] - h_1[x]| < N$ ($x \in [1; B]$, $y \in [1; B]$ and $y \neq x$) the expression can be simplified to:

$$R_k[n] = G \cdot a_x[n] \cdot C[k] \cdot \prod_{l=2}^{L} C[k_l[x]]$$

This result reveals that by using (1) only the reference signal of the modulated spur which is down-converted due to the k harmonic of $LO_1$ is retrieved.

In this manner the in-phase and quadrature component can be retrieved. For the calculation of the in-phase component the calculation of the discrete Fourier series coefficient starts with the low frequency signal retrieved from the path which has the reference signal phase shifted by 0 and for quadrature component with the signal retrieved from the path which has the reference signal phase shifted by $$\frac{\pi}{2}.$$

(FIG. 10).

Figure 13:
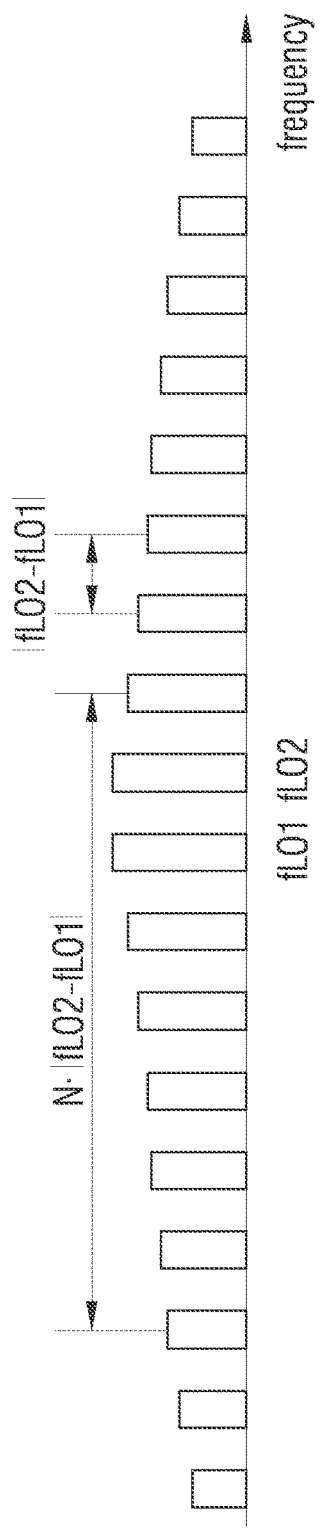
FIG. 13 illustrates separable interferers in an example.

The presented example method for retrieving the reference signals may have the limitation that two modulated spurs, which are spaced in frequency equal to multiples of $N \cdot |fLO2 - fLO1|$ cannot be separated as illustrated by FIG. 13. FIG. 13 illustrates separable interferers in an example. FIG. 13 shows a frequency axis with a number of interferes separated by $|fLO2 - fLO1|$. Due to the composition of the signals (odd and even harmonics) and the multiplication in the time domain there are weighted repetitions in the frequency domain every $N|fLO2 - fLO1|$ as indicated in FIG. 13. To extend the range of coexisting interferers the number of phase shifts of the first LO signal and therefore the number of parallel paths can be increased. A higher number of phase shifts requires a lower duty cycle, which increases the requirements on the LO signal of the first mixer. To overcome this issue, the LO signal of the second mixer can be phase shifted by $$\frac{2 \cdot \pi \cdot m}{N-1}$$

too. This relaxes the requirements on the LO signal and changes the range of coexisting interferers to N·(N−1)·|fLO2−fLO1|. Considering a 2CA case with eight parallel paths, eight coexisting interferers can be separated by phase shifting the signal of LO1 which has a duty cycle of ⅛. In comparison, in a 2CA case with 12 parallel paths, 12 coexisting interferer can be separated by phase shifting the signal of LO1 and LO2 which only have a duty cycle of ¼ and ⅓, respectively.

Figure 14:
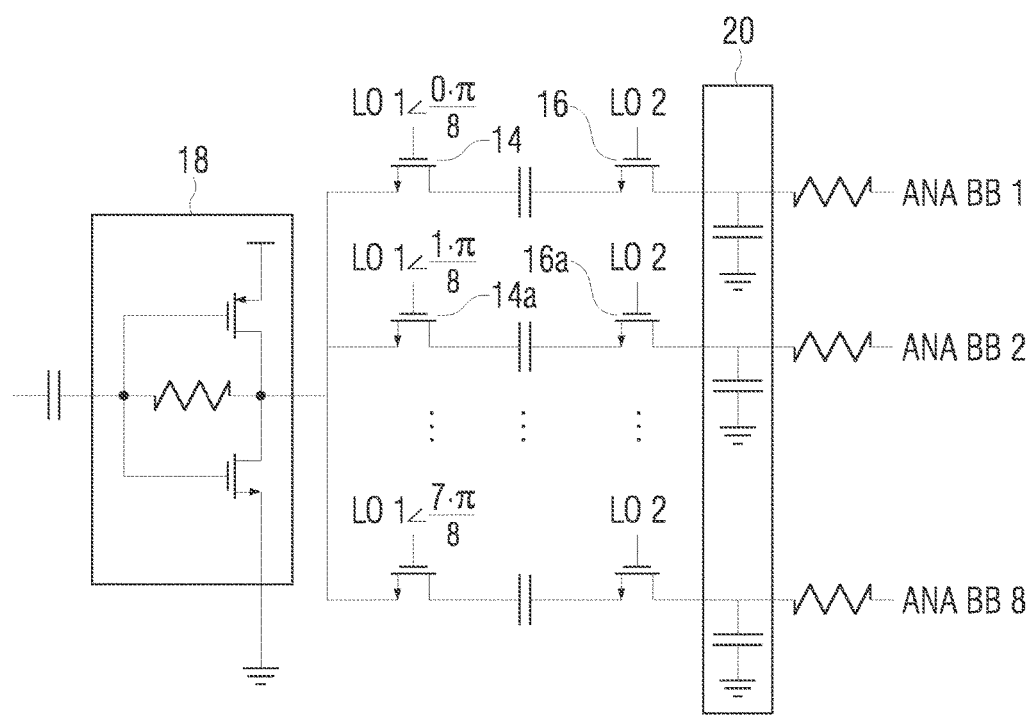
FIG. 14 shows an implementation of an example for separating multiple interferers.

FIG. 14 shows an implementation of an example for separating multiple interferers, which corresponds to the implementation shown for the example implementation in FIG. 5. The output of an LNA 18 is coupled into a number of parallel mixing branches, each of which comprising a number of subsequent mixers. For example, the first branch in the example depicted in FIG. 14 comprises the first mixer 14 and a second mixer 16, in the parallel second branch there is mixer 14a preceding mixer 16a, and so on. Subsequent low pass filtering 20 then yields the respective baseband signals 20, in this example eight different auxiliary interference signals based on eight phase shifted versions of LO 1 subsequently mixed with LO 2.

Figure 15:
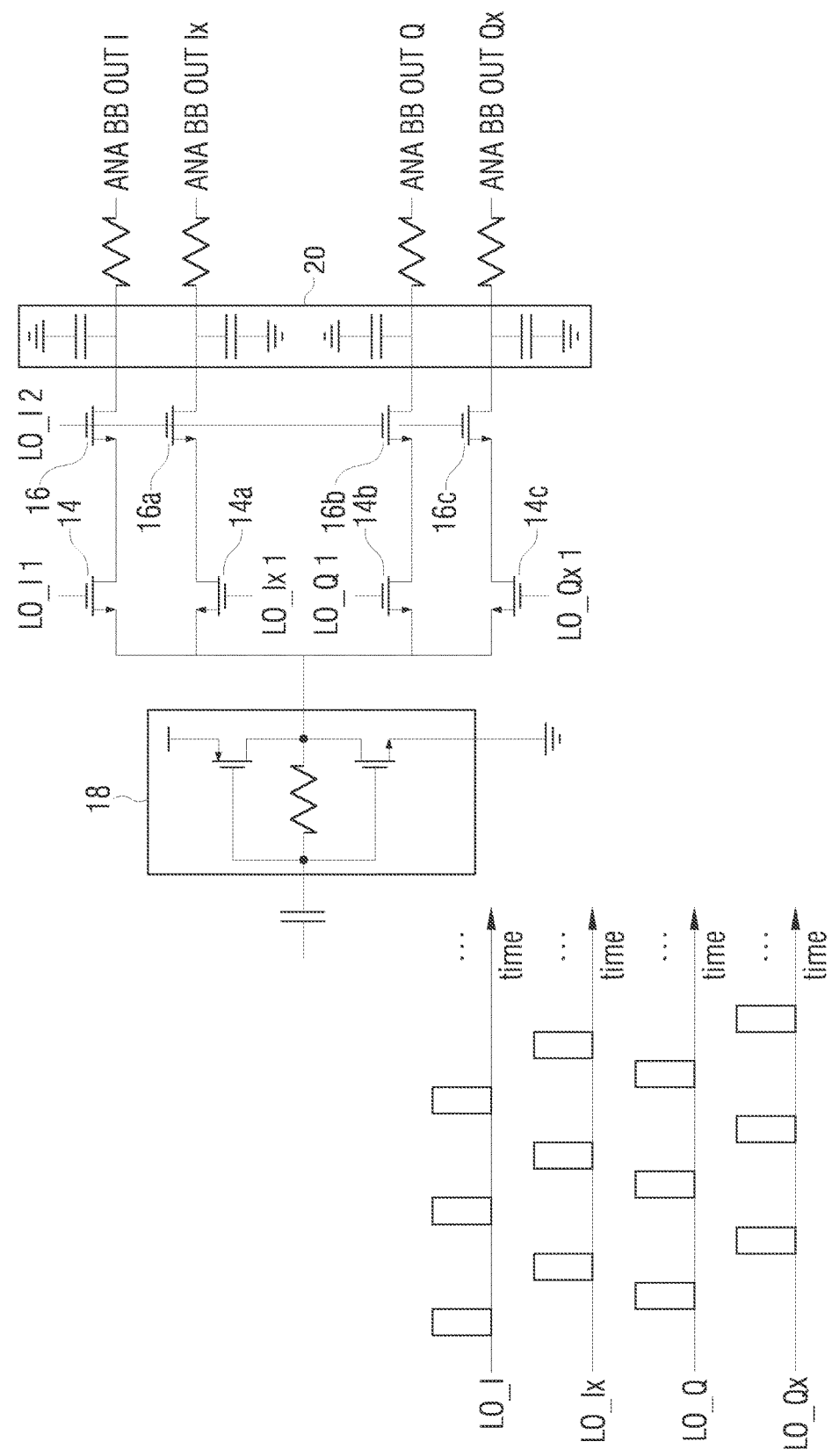
FIG. 15 illustrates another implementation in an example in a hardware demonstrator.

FIG. 15 illustrates another implementation in an example. FIG. 15 shows an implementation of a hardware demonstrator which was used to demonstrate the benefits of an example of the interference detection device 10. After an LNA 18, in push-pull MOSFET implementation as described above, the output signal is input into four parallel mixing branches. In the first mixing stage phase shifts are introduced, pi/2 in this case yielding the pulsed oscillator signals LO_I, LO_Ix, LO_Q, LO_Qx as depicted on the left side of FIG. 15. The four mixers 14, 14a, 14b, and 14c are implemented using MOSFETs as explained above. For the second mixers 16, 16a, 16b, and 16c in each branch in phase signals LO_I2 are used and the resulting signals are low pass filtered 20 to obtain analog baseband output signals.

Figure 16:
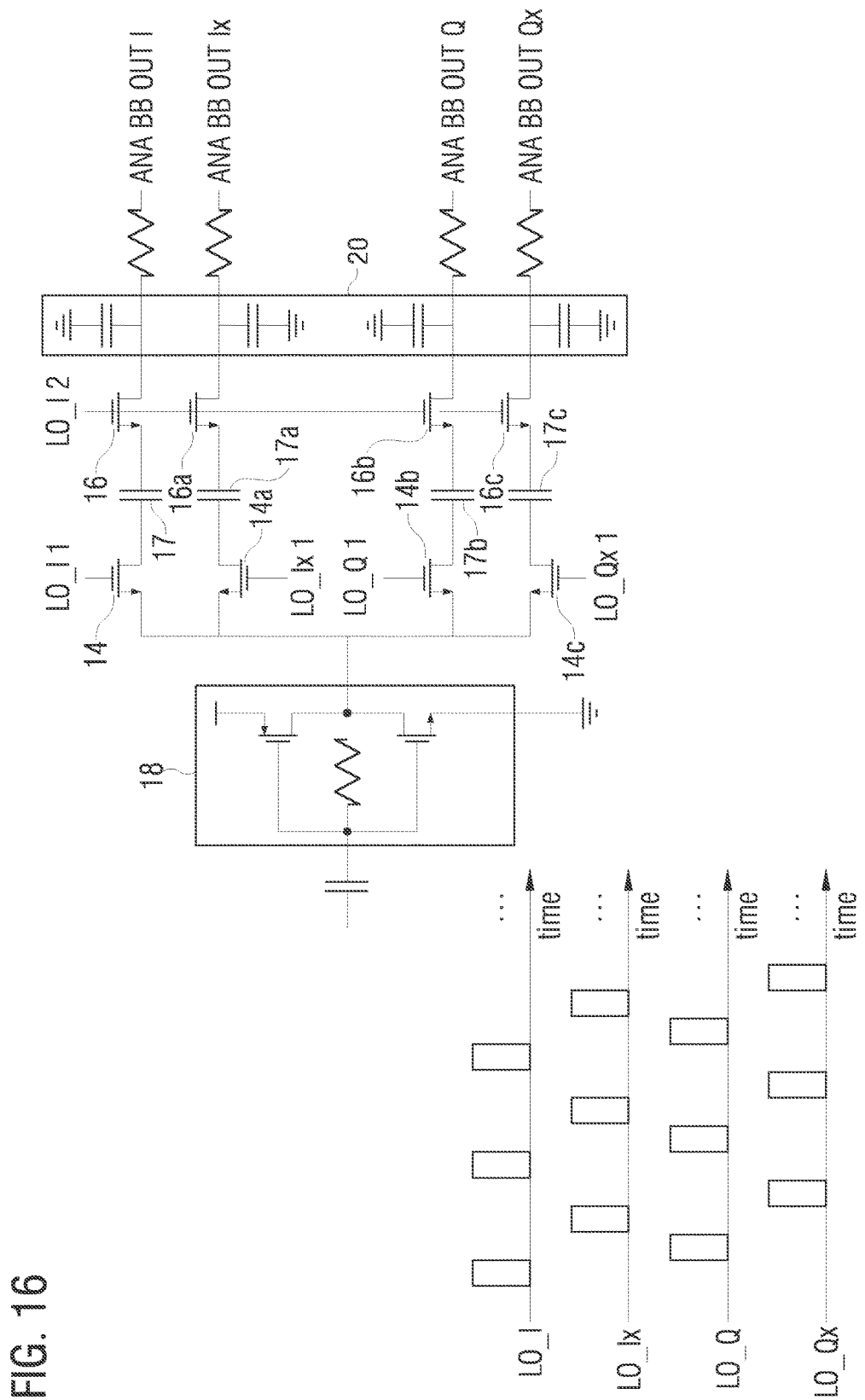
FIG. 16 shows another implementation of an example detection circuit.

FIG. 16 shows another implementation of an example of a detection circuit. The implementation is similar to the implementation shown and described in FIG. 15. Additionally there are capacitors 17, 17a, 17b and 17c between the subsequent mixers 14/16, 14a/16a, 14b/16b, and 14c/16c. In this example the first mixing stage 14, 14a, 14b, 14c carries out differential mixing, similar to the example of the hardware demonstrator architecture but with added high-pass filtering capacitors 17, 17a, 17b and 17c between the mixing stages. The reason is that when having an unbalanced first mixing stage, some part of a signal at LO2 frequency (2nd wanted signal) leaks to the second stage without any frequency conversion and then gets down-converted to DC by the second mixing stage 16, 16a, 16b, and 16c. By using a balanced first mixer, examples can be limited to detecting harmonic combinations involving only odd harmonics of the first LO signal but since in a second receiver chain the situation may be symmetric, serial mixing detectors from both chains (RX1 and RX2) together may recover all combinations in further examples.

The examples as described herein may be summarized as follows:

In a first example an interference detection device 10 is configured to generate an auxiliary interference signal for a multi-carrier receive signal. The device 10 comprises a generator 12 configured to generate a plurality of oscillator signals. The plurality of oscillator signals comprises at least a first oscillator signal with a first local oscillator frequency. The plurality of oscillator signals further comprises a second oscillator signal with a second local oscillator frequency. The device 10 further comprises a plurality of subsequent mixers, comprising a first mixer 14 configured to mix the multi-carrier receive signal with the first oscillator signal to output a first mixed signal, and a second mixer 16 configured to mix a second mixed signal with the second oscillator signal to output the auxiliary interference signal.

In example 2 the first mixed signal is the second mixed signal input into the second mixer 16.

In example 3 in the interference detection device 10 of example 1 the plurality of oscillator signals comprises one or more additional oscillator signals having one or more additional local oscillator frequencies being adjusted to one or more additional carrier frequencies of the multi-carrier receive signal. The interference detection device 10 further comprises one or more intermediate mixers 15 between the first mixer 14 and the second mixer 16, wherein the one or more intermediate mixers 15 are configured to mix the first mixed signal with at least one of the additional oscillator signals and to output the second mixed signal as input signal for the second mixer 16.

In example 4 the interference detection device 10 of one of the examples 1 to 3 comprises a low noise amplifier 18 to provide the multi-carrier receive signal, or wherein first oscillator frequency is adjusted to a first carrier signal of the multi-carrier signal and wherein the second oscillator signal is adjusted to a second carrier frequency of the multi-carrier signal.

In example 5 in the interference detection device 10 of one of the examples 1 to 4 at least one mixer 14, 15, 16 comprises an inphase mixing stage and a quadrature mixing stage to provide an inphase and a quadrature output signal.

In example 6 in the interference detection device 10 of one of the examples 1 to 5 the generator 12 is configured to generate at least one oscillator signal having an inphase component signal and a quadrature component signal.

In example 7 in the interference detection device 10 of one of the examples 1 to 6 the generator 12 is configured to generate pulsed oscillator signals having odd and even harmonics.

In example 8 in the interference detection device 10 of example 7 at least one pulsed oscillator signal comprises quadrature pulses.

In example 9 in the interference detection device 10 of one of the examples 7 or 8 the generator 12 is configured to generate pulsed oscillator signals from sinusoidal oscillator signals using a delay-locked-loop.

In example 10 in the interference detection device 10 of one of the examples 7 to 9 the generator 12 provides adjustable boost levels for harmonics.

In example 11 the interference detection device 10 of one of the examples 1 to 10 comprises a low pass filter 20 configured to low pass filter an output signal of the second mixer 16 to obtain the auxiliary interference signal.

In example 12 the interference detection device 10 of one of the examples 1 to 11 comprises an analog-to-digital converter 22 configured to digitize the auxiliary interference signal.

In example 13 in the interference detection device 10 of one of the examples 1 to 12 the plurality of subsequent mixers corresponds to a first mixing branch, and the interference detection device 10 comprises at least a second mixing branch, which comprises a further plurality of additional subsequent mixers. A first additional mixer 14a is configured to mix the multicarrier receive signal with a version of the first oscillator signal to output a first additional mixed signal. A second additional mixer 16a is configured to mix an additional second mixed signal with a version of the second oscillator signal to obtain an additional auxiliary interference signal.

In example 14 in the interference detection device 10 of example 13 the version of the first oscillator signal is a phase shifted version of the first oscillator signal, or the version of the second oscillator signal is a phase shifted version of the second oscillator signal.

In example 15 the interference detection device 10 of one of the examples 13 or 14 comprises three or more parallel mixing branches, each comprising at least two subsequent mixers, and at least one oscillator signal is used with three or more different phase shifts in the three or more parallel mixing branches.

In example 16 in the interference detection device 10 of example 15 at least two oscillator signals are used with different phase shifts in the three or more parallel mixing branches.

In example 17 in the interference detection device 10 of one of the examples 15 or 16 at least one oscillator signal is used with evenly distributed phase shifts in the three or more parallel mixing branches.

In example 18 in the interference detection device 10 of one of the examples 15 to 17 at least two oscillator signals are used with evenly distributed phase shifts in the three or more parallel mixing branches.

In example 19 in the interference detection device 10 of one of the examples 15 to 18 at least two oscillator signals are used with evenly distributed phase shifts in the three or more parallel mixing branches, and the number of phase shifted versions of the first oscillator signal differs from a number of phase shifted versions of the second oscillator signal.

In example 20 an interference detection apparatus 10 for generating an auxiliary interference signal for a multi-carrier receive signal comprises means for generating 12 a plurality of oscillator signals. The plurality of oscillator signals comprising at least a first oscillator signal with a first local oscillator frequency. The plurality of oscillator signals further comprises a second oscillator signal with a second local oscillator frequency. The apparatus 10 further comprises at least two subsequent mixing means. A first mixing means 14 is configured to mix the multi-carrier receive signal with the first oscillator signal to output a first mixed signal. A second mixing means 16 is configured to mix a second mixed signal with the second oscillator signal to output the auxiliary interference signal.

In example 21 the first mixed signal is the second mixed signal input into the second mixer 16.

In example 22 in the interference detection apparatus 10 of example 20 the plurality of oscillator signals comprises one or more additional oscillator signals having one or more additional local oscillator frequencies being adjusted to one or more additional carrier frequencies of the multi-carrier receive signal. The interference detection apparatus 10 further comprises one or more intermediate mixing means 15 between the first mixing means 14 and the second mixing means 16, the one or more intermediate mixing means 15 are configured to mix an output signal of the first mixing means 14 with at least one of the additional oscillator signals and to output the second signal as input for the second mixing means 16.

In example 23 the interference detection apparatus 10 of one of the examples 20 to 22 comprises a low noise amplifying means 18 for providing the multi-carrier receive signal or wherein first oscillator frequency is adjusted to a first carrier signal of the multi-carrier signal and wherein the second oscillator signal is adjusted to a second carrier frequency of the multi-carrier signal.

In example 24 in the interference detection apparatus 10 of one of the examples 20 to 23 at least one mixing means 14, 15, 16 comprises an inphase mixing means and a quadrature mixing means to provide an inphase and a quadrature output signal.

In example 25 in the interference detection apparatus 10 of one of the examples 20 to 24 the means for generating 12 is configured to generate at least one oscillator signal having an inphase component signal and a quadrature component signal.

In example 26 in the interference detection apparatus 10 of one of the examples 20 to 25 the means for generating 12 is configured to generate pulsed oscillator signals having odd and even harmonics.

In example 27 in the interference detection apparatus 10 of example 26 at least one pulsed oscillator signal comprises quadrature pulses.

In example 28 in the interference detection apparatus 10 of one of the examples 26 or 27 the means for generating 12 is configured to generate pulsed oscillator signals from sinusoidal oscillator signals using a delay-locked-loop.

In example 29 in the interference detection apparatus 10 of one of the examples 26 to 28 the means for generating 12 provides adjustable boost levels for harmonics.

In example 30 the interference detection apparatus 10 of one of the examples 20 to 29 further comprises a low pass filtering means 20 for low pass filtering an output signal of the second mixing means 16 to obtain the auxiliary interference signal.

In example 31 the interference detection apparatus 10 of one of the examples 20 to 30 further comprises an analog-to-digital converting means 22 for digitizing the auxiliary interference signal.

In example 32 in the interference detection apparatus 10 of one of the examples 20 to 31 the at least two subsequent mixing means correspond to a first mixing branch, and the interference detection apparatus 10 comprises at least a second mixing branch, which comprises a further plurality of additional subsequent mixing means. A first additional mixing means 14a is configured to mix the multicarrier receive signal with a version of the first oscillator signal to output an first additional mixed signal, and a second additional mixing means 16a is configured to mix an additional second mixed signal with a version of the second oscillator signal to obtain an additional auxiliary interference signal.

In example 33 in the interference detection apparatus 10 of example 32 the version of the first oscillator signal is a phase shifted version of the first oscillator signal, or the version of the second oscillator signal is a phase shifted version of the second oscillator signal.

In example 34 the interference detection apparatus 10 of one of the examples 32 or 33 comprises three or more parallel mixing branches, each comprises at least two subsequent mixing means, wherein at least one oscillator signal is used with three or more different phase shifts in the three or more parallel mixing branches.

In example 35 in the interference detection apparatus 10 of example 34 at least two oscillator signals are used with different phase shifts in the three or more parallel mixing branches.

In example 36 in the interference detection apparatus 10 of one of the examples 33 or 34 at least one oscillator signal is used with evenly distributed phase shifts in the three or more parallel mixing branches.

In example 37 in the interference detection apparatus 10 of one of the examples 33 to 36 at least two oscillator signals are used with evenly distributed phase shifts in the three or more parallel mixing branches.

In example 38 in the interference detection apparatus 10 of one of the examples 34 to 37 at least two oscillator signals are used with evenly distributed phase shifts in the three or more parallel mixing branches, and the number of phase shifted versions of the first oscillator signal differs from a number of phase shifted versions of the second oscillator signal.

In example 39 a receiver 100 comprises one or more interference detection devices 10 according one of the examples 1 to 19 or one or more interference detection apparatuses 10 according to one of the examples 20 to 38.

In example 40 the receiver 100 of example 39 comprises two or more interference detection devices 10 or two or more interference detection apparatuses 10. The two or more interference detection devices 10 or two or more interference detection apparatuses 10 use pulsed oscillator signals having different duty cycles.

In example 41 the receiver 100 of one of the examples 39 or 40 further comprises a parallel receiver processing chain 30 configured to process the multi-carrier receive signal in parallel to the interference detection device 10 or apparatus.

In example 42 the receiver 100 of example 41 further comprises a signal processor 32 configured to process a baseband output signal of the parallel receiver processing chain 30 based on the auxiliary interference signal to reduce interference in the baseband output signal.

In example 43 in the receiver 100 of example 42 the signal processor 32 is configured to perform adaptive interference cancellation in the baseband output signal.

In example 44 the receiver 100 of one of the examples 39 to 43 is configured to reuse the oscillator signals generated by the generator 12 for the interference detection device 10 or by the generating means 12 for the interference detection apparatus and the parallel receiver processing chain 30.

In example 45 the receiver 100 of one of the examples 42 to 44 comprises multiple parallel mixing branches generating multiple auxiliary interference signals. The signal processor 32 is configured to process multiple auxiliary interference signals to determine two or more separated interference signals for subsequent interference cancellation.

In example 46 in the receiver 100 of example 45 the signal processor 32 is configured to determine the two or more separated interference signals using a discrete Fourier series derivation based on three or more auxiliary interference signals.

In example 47 an interference detection method for generating an auxiliary interference signal for a multi-carrier receive signal comprises generating 40 a plurality of oscillator signals. The plurality of oscillator signals comprising at least a first oscillator signal with a first local oscillator frequency. The plurality of oscillator signals further comprises a second oscillator signal with a second local oscillator frequency. The method further comprises first mixing 42 the multicarrier receive signal with the first oscillator signal to output a first mixed signal. The method further comprises second mixing 44 a second mixed signal with the second oscillator signal to output the auxiliary interference signal.

In example 48 the first mixed signal is the second mixed signal input into the second mixing 44.

In example 49 in the interference detection method of example 47 the plurality of oscillator signals comprises one or more additional oscillator signals having one or more additional local oscillator frequencies being adjusted to one or more additional carrier frequencies of the multi-carrier receive signal. The interference detection method further comprises one or more intermediate mixings 43 between the first mixing 42 and the second mixing 44. The one or more intermediate mixings 43 comprises mixing the first mixed signal with one or more of the additional oscillator signals and outputting a resulting signal as second mixed signal for the second mixing 44.

In example 50 the interference detection method of one of the examples 47 to 49 comprises low noise amplifying 46 for providing the multi-carrier receive signal, or wherein first oscillator frequency is adjusted to a first carrier signal of the multi-carrier signal and wherein the second oscillator signal is adjusted to a second carrier frequency of the multi-carrier signal.

In example 51 in the interference detection method of one of the examples 47 to 50 at least one mixing 42, 43, 44 comprises inphase mixing and quadrature mixing for providing an inphase and a quadrature output signal.

In example 52 in the interference detection method of one of the examples 47 to 51 the generating 40 comprises generating at least one oscillator signal having an inphase component signal and a quadrature component signal.

In example 53 in the interference detection method of one of the examples 47 to 52 the generating 40 comprises generating pulsed oscillator signals having odd and even harmonics.

In example 54 in the interference detection method of example 54 at least one pulsed oscillator signal comprises quadrature pulses.

In example 55 in the interference detection method of one of the examples 53 or 54 the generating 40 comprises generating pulsed oscillator signals from sinusoidal oscillator signals using a delay-locked-loop.

In example 56 in the interference detection method of one of the examples 47 to 55 the generating 40 provides adjustable boost levels for harmonics.

In example 57 the interference detection method of one of the examples 47 to 56 further comprises low pass filtering 48 an output signal of the second mixing 44 to obtain the auxiliary interference signal.

In example 58 the interference detection method of one of the examples 47 to 57 further comprises analog-to-digital converting 50 for digitizing the auxiliary interference signal.

In example 59 in the interference detection method of one of the examples 47 to 58 the first and second mixing correspond to a mixing in a first mixing branch. The interference detection method comprises at least mixing in a second mixing branch, which comprises an additional subsequent mixing. A first additional mixing mixes the multi-carrier receive signal with a version of the first oscillator signal to output a first additional mixed signal. A second further mixing is mixes an additional second mixed signal with a version of the second oscillator signal to obtain or to output an additional auxiliary interference signal.

In example 60 in the interference detection method of example 59 the version of the first oscillator signal is a phase shifted version of the first oscillator signal, or the version of the second oscillator signal is a phase shifted version of the second oscillator signal.

In example 61 the interference detection method of one of the examples 59 or 60 comprises mixing in three or more parallel mixing branches, each comprises at least two subsequent mixing steps, wherein at least one oscillator signal is used with three or more different phase shifts in the three or more parallel mixing branches.

In example 62 in the interference detection method of example 61 at least two oscillator signals are used with different phase shifts in the three or more parallel mixing branches.

In example 63 in the interference detection method of one of the examples 61 or 62 at least one oscillator signal is used with evenly distributed phase shifts in the three or more parallel mixing branches.

In example 64 in the interference detection method of one of the examples 61 to 63 at least two oscillator signals are used with evenly distributed phase shifts in the three or more parallel mixing branches.

In example 65 in the interference detection method of one of the examples 59 to 64 at least two oscillator signals are used with evenly distributed phase shifts in the three or more parallel mixing branches, and the number of phase shifted versions of the first oscillator signal differs from a number of phase shifted versions of the second oscillator signal.

In example 66 a method for receiving comprises a method for interference detection according one of the examples 47 to 65.

In example 67 the method of example 66 comprises two or more methods for interference detection, wherein the two or more interference detection methods use pulsed oscillator signals having different duty cycles.

In example 68 the method of one of the examples 66 or 67 further comprises processing the multi-carrier receive signal in parallel to the interference detection method.

In example 69 the method of example 68 further comprises processing a baseband output signal of the parallel processing based on the auxiliary interference signal to reduce interference in the baseband output signal.

In example 70 the method of example 69 further comprises performing adaptive interference cancellation in the baseband output signal.

In example 71 the method of one of the examples 66 to 70 further comprises reusing the oscillator signals generated in the parallel processing.

In example 72 the method of one of the examples 68 to 71 comprises multiple parallel mixing branches generating multiple auxiliary interference signals. The processing processes multiple auxiliary interference signals to determine two or more separated interference signals for subsequent interference cancellation.

In example 73 in the method of example 72 the processing is configured to determine the two or more separated interference signals using a discrete Fourier series derivation based on three or more auxiliary interference signals.

In example 74 a computer program has a program code for performing the method of at least one of the examples 47 to 73, when the computer program is executed on a computer, a processor, or a programmable hardware component.

In example 75 a machine readable storage includes machine readable instructions, when executed, to implement a method or realize an apparatus as exemplified any example herein.

In example 76 a machine readable medium includes code, when executed, to cause a machine to perform the method of any one of examples 47 to 73.

In example 77 a radio receiver 200, 300 comprises the receiver 100 of one of the examples 39 to 46.

In example 78 a mobile terminal 200 comprises the radio receiver of example 77.

In example 79 a base station 300 comprises the radio receiver of example 77.

A person of skill in the art would readily recognize that steps of various above-described methods may be performed by programmed computers. Herein, some examples are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further examples are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, exemplify the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing", "means for determining", "means for inputting", etc., may be provided through the use of dedicated hardware, such as "a signal provider", "a signal processing unit", "a processor", "a controller", "a determiner", "an input", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry exemplifying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some examples a single act may include or may be broken into multiple sub acts. Such sub acts may be included and part of the disclosure of this single act unless explicitly excluded.

What is claimed is:

1. An interference detection device configured to generate an auxiliary interference signal for a multi-carrier receive signal, comprising
    a generator configured to generate a plurality of oscillator signals, the plurality of oscillator signals comprising at least a first oscillator signal with a first local oscillator frequency and a second oscillator signal with a second local oscillator frequency;
    a plurality of subsequent mixers comprising:
    a first mixer configured to mix the multi-carrier receive signal with the first oscillator signal to output a first mixed signal and
    a second mixer, configured to mix a second mixed signal with the second oscillator signal to output the auxiliary interference signal,
    wherein the plurality of oscillator signals comprises one or more additional oscillator signals having one or more additional local oscillator frequencies being adjusted to one or more additional carrier frequencies of the multi-carrier receive signal, the interference detection device further comprising one or more intermediate mixers between the first mixer and the second mixer to provide the second mixed signal.

2. The interference detection device of claim 1, wherein the one or more intermediate mixers are configured to mix the first mixed signal with at least one of the one or more additional oscillator signals to output the second mixed signal as input signal of the second mixer.

3. The interference detection device of claim 1, comprising a low noise amplifier to provide the multi-carrier receive signal, or wherein first oscillator frequency is adjusted to a first carrier signal of the multi-carrier signal and wherein the second oscillator signal is adjusted to a second carrier frequency of the multi-carrier signal.

4. The interference detection device of claim 1, wherein at least one mixer comprises an inphase mixing stage and a quadrature mixing stage to provide an inphase and a quadrature output signal.

5. The interference detection device of claim 1, wherein the generator is configured to generate at least one oscillator signal having an inphase component signal and a quadrature component signal.

6. The interference detection device of claim 1, wherein the generator is configured to generate pulsed oscillator signals having odd and even harmonics.

7. The interference detection device of claim 6, wherein at least one pulsed oscillator signal comprises quadrature pulses.

8. The interference detection device of claim 6, wherein the generator is configured to generate pulsed oscillator signals from sinusoidal oscillator signals using a delay-locked-loop.

9. The interference detection device of claim 6, wherein the generator provides adjustable boost levels for harmonics.

10. The interference detection device of claim 9, further comprising a low pass filter configured to low pass filter an output signal of the second mixer to obtain the auxiliary interference signal.

11. The interference detection device of claim 10, further comprising an analog-to-digital converter configured to digitize the auxiliary interference signal.

12. A receiver comprising one or more interference detection devices according to claim 1.

13. The receiver of claim 12, comprising two or more interference detection devices, wherein the two or more interference detection devices use pulsed oscillator signals having different duty cycles.

14. The receiver of claim 12, further comprising a parallel receiver processing chain configured to process the multi-carrier receive signal in parallel to the interference detection device.

15. The receiver of claim 14, further comprising a signal processor configured to process a baseband output signal of the parallel receiver processing chain based on the auxiliary interference signal to reduce interference in the baseband output signal.

16. A radio receiver comprising the receiver of claim 12.

17. A mobile terminal comprising the radio receiver of claim 16.

18. A base station comprising the radio receiver of claim 16.

19. An interference detection method for generating an auxiliary interference signal for a multi-carrier receive signal, comprising
generating a plurality of oscillator signals, the plurality of oscillator signals comprising at least a first oscillator signal with a first local oscillator frequency, and a second oscillator signal with a second local oscillator frequency;
first mixing the multicarrier receive signal with the first oscillator signal to output a first mixed signal,
second mixing of a second mixed signal with the second oscillator signal to output the auxiliary interference signal,
wherein the plurality of oscillator signals comprises one or more additional oscillator signals having one or more additional local oscillator frequencies being adjusted to one or more additional carrier frequencies of the multi-carrier receive signal, the interference detection method further comprising one or more intermediate mixings between the first mixing and the second mixing to provide the second mixed signal.

20. The interference detection method of claim 19, wherein the one or more intermediate mixings comprises mixing the first mixed signal with at least one of the additional oscillator signals and to output the second mixed signal as input for the second mixing.

21. The interference detection method of claim 19, comprising low noise amplifying for providing the multi-carrier receive signal, or wherein first oscillator frequency is adjusted to a first carrier signal of the multi-carrier signal and wherein the second oscillator signal is adjusted to a second carrier frequency of the multi-carrier signal.

22. The interference detection method of claim 19, wherein the first and second mixing correspond to a mixing in a first mixing branch, and wherein the interference detection method comprises at least mixing in a second mixing branch, which comprises additional subsequent mixing, wherein a first additional mixing mixes the multicarrier receive signal with a version of the first oscillator signal to output an additional first mixed signal, and wherein a second additional mixing mixes an additional second mixed signal with a version of the second oscillator signal to output an additional auxiliary interference signal,
wherein the mixing in the second mixing branch further comprises one or more intermediate additional mixings between the first additional mixing and the second additional mixing, wherein the one or more intermediate additional mixings comprise mixing the additional first mixed signal with at least one version of the additional oscillator signals and to output the additional second mixed signal as input for the additional second mixing.

23. A non-transitory machine readable medium including code, when executed, to cause a machine to perform, when the computer program is executed on a computer, a processor, or a programmable hardware component, an interference detection method for generating an auxiliary interference signal for a multi-carrier receive signal, comprising
generating a plurality of oscillator signals, the plurality of oscillator signals comprising at least a first oscillator signal with a first local oscillator frequency, and a second oscillator signal with a second local oscillator frequency;
first mixing the multicarrier receive signal with the first oscillator signal to output a first mixed signal; and
second mixing of a second mixed signal with the second oscillator signal to output the auxiliary interference signal,
wherein the plurality of oscillator signals comprises one or more additional oscillator signals having one or more additional local oscillator frequencies being adjusted to one or more additional carrier frequencies of the multi-carrier receive signal, the interference detection method further comprising one or more intermediate mixings between the first mixing and the second mixing to provide the second mixed signal.

* * * * *